US012782261B2

(12) United States Patent
Karny et al.

(10) Patent No.: US 12,782,261 B2
(45) Date of Patent: Nov. 3, 2026

(54) FULL FIELD MORPHOLOGY—PRECISE QUANTIFICATION OF CELLULAR AND SUB-CELLULAR MORPHOLOGICAL EVENTS IN RED/WHITE BLOOD CELLS

(71) Applicant: SCOPIO LABS LTD., Tel Aviv (IL)

(72) Inventors: Shahar Karny, Hod HaSharon (IL); Ben Leshem, Tel Aviv (IL); Erez Na'Aman, Tel Aviv (IL); Eran Small, Yahud (IL); Itai Hayut, Tel Aviv (IL)

(73) Assignee: SCOPIO LABS LTD., Tel Aviv (IL)

( * ) Notice: Subject to any disclaimer, the term of this patent is extended or adjusted under 35 U.S.C. 154(b) by 72 days.

(21) Appl. No.: 18/248,566

(22) PCT Filed: Nov. 9, 2021

(86) PCT No.: PCT/IL2021/051329
§ 371 (c)(1),
(2) Date: Apr. 11, 2023

(87) PCT Pub. No.: WO2022/097155
PCT Pub. Date: May 12, 2022

(65) Prior Publication Data

US 2023/0384205 A1 Nov. 30, 2023

Related U.S. Application Data

(60) Provisional application No. 63/198,728, filed on Nov. 9, 2020.

(51) Int. Cl.
*G01N 15/1434* (2024.01)
*G02B 21/00* (2006.01)
(Continued)

(52) U.S. Cl.
CPC ....... *G01N 15/1434* (2013.01); *G02B 21/008* (2013.01); *G06T 3/4053* (2013.01);
(Continued)

(58) Field of Classification Search
None
See application file for complete search history.

(56) References Cited

U.S. PATENT DOCUMENTS 8,351,675 B2 1/2013 So
9,767,343 B1 9/2017 Jones
(Continued)

FOREIGN PATENT DOCUMENTS

CN 1653332 8/2005
EP 1027272 8/2000
(Continued)

OTHER PUBLICATIONS

"White Blood Cell Differential Count," OB-GYN 101: Introductory Obstetrics & Gynecology, retrieved Nov. 3, 2021 from https://oacapps.med.jhmi.edu/OBGYN-101/Lab/White%20Blood%20Cell%20Differential%20Count.htm, 4 pages.
(Continued)

*Primary Examiner* — Heather R Jones
(74) *Attorney, Agent, or Firm* — FisherBroyles, LLP; John K. Shimmick

(57) ABSTRACT

A microscope system for full field morphology analysis may include an optical scanning apparatus to scan the sample with an effective numerical aperture of at least 0.8, and a processor coupled to the scanning apparatus. The processor may be configured to: scan the sample with the optical scanning apparatus to produce a plurality of images of the sample, the plurality of images comprising at least 500 blood cells, analyze the plurality of images to determine at least 10 morphology parameters for each of the at least 500 blood cells, and output the at least 10 morphology parameters. The microscope system may include a display for presenting data. Various other systems and methods are provided.

22 Claims, 8 Drawing Sheets

(51) Int. Cl.

| | |
|---|---|
| ***G06T 3/4053*** | (2024.01) |
| ***G06T 7/00*** | (2017.01) |
| ***G06V 20/69*** | (2022.01) |
| *G01N 15/01* | (2024.01) |

(52) U.S. Cl.

CPC .......... *G06T 7/0012* (2013.01); *G06V 20/693* (2022.01); *G06V 20/698* (2022.01); *G01N 2015/012* (2024.01); *G01N 2015/016* (2024.01); *G06T 2207/10056* (2013.01); *G06T 2207/30024* (2013.01)

(56) References Cited

U.S. PATENT DOCUMENTS

| | | | | |
|---|---|---|---|---|
| 10,558,029 | B2 | 2/2020 | Leshem | |
| 10,705,326 | B2 | 7/2020 | Small | |
| 2005/0241774 | A1 | 11/2005 | Hart | |
| 2010/0254588 | A1 | 10/2010 | Cualing | |
| 2011/0261164 | A1 | 10/2011 | Olesen | |
| 2012/0088230 | A1 | 4/2012 | Givens | |
| 2012/0123205 | A1 | 5/2012 | Nie | |
| 2012/0257037 | A1* | 10/2012 | Raicu | G01J 3/027 382/133 |
| 2013/0004053 | A1 | 1/2013 | Hunter | |
| 2013/0079599 | A1 | 3/2013 | Holmes | |
| 2013/0314526 | A1* | 11/2013 | Yasuda | G01N 33/487 348/79 |
| 2016/0070949 | A1 | 3/2016 | Tunstall | |
| 2016/0223554 | A1 | 8/2016 | Cesano | |
| 2017/0212983 | A1 | 7/2017 | Cai | |
| 2017/0220000 | A1 | 8/2017 | Ozcan | |
| 2017/0363633 | A1 | 12/2017 | Cesano | |
| 2018/0012062 | A1* | 1/2018 | Zahniser | G06V 20/698 |
| 2018/0156713 | A1 | 6/2018 | Berezhna | |
| 2018/0211380 | A1* | 7/2018 | Tandon | G06V 20/69 |
| 2018/0348500 | A1 | 12/2018 | Naaman, III | |
| 2018/0373016 | A1 | 12/2018 | Leshem, III | |
| 2019/0235224 | A1 | 8/2019 | Small | |
| 2019/0384962 | A1 | 12/2019 | Hayut | |
| 2020/0041780 | A1 | 2/2020 | Na'Aman | |
| 2020/0278362 | A1 | 9/2020 | Hayut | |
| 2020/0278530 | A1 | 9/2020 | Madar | |
| 2020/0302144 | A1 | 9/2020 | Leshem | |
| 2021/0327061 | A1 | 10/2021 | Clymer | |

FOREIGN PATENT DOCUMENTS

| | | | |
|---|---|---|---|
| WO | 02101635 | | 12/2002 |
| WO | 03078965 | | 9/2003 |
| WO | 2014146063 | | 9/2014 |
| WO | 2017081539 | | 5/2017 |
| WO | 2017081540 | | 5/2017 |
| WO | 2017081541 | | 5/2017 |
| WO | 2017081542 | | 5/2017 |
| WO | 2017103037 | | 6/2017 |
| WO | 2018078447 | | 5/2018 |
| WO | 2018078448 | | 5/2018 |
| WO | 2018211418 | A1 | 11/2018 |
| WO | 2019077610 | | 4/2019 |
| WO | 2019097523 | | 5/2019 |
| WO | 2019097524 | | 5/2019 |
| WO | 2020041517 | | 2/2020 |
| WO | 2020129064 | | 6/2020 |
| WO | 2021095037 | | 5/2021 |
| WO | 2022097155 | | 5/2022 |
| WO | 2022107132 | | 5/2022 |
| WO | 2022249191 | | 12/2022 |
| WO | 2023089611 | | 5/2023 |
| WO | 2023161932 | | 8/2023 |

OTHER PUBLICATIONS

Cherian, Sindhu, "Flow Cytometry in the Hematology Lab: The Flow Cytometry WBC Differential" International Clinical Cytometry Society, vol. II No. 2, Spring 2011, retrieved Nov. 3, 2021 from https://www.cytometry.org/newsletters/eICCS-2-2/article5.php, 4 pages).

International Search Report and Written Opinion for PCT/IL2021/051329, 10 pages (Jul. 26, 2022).

Neel, Jennifer, A., et al., "Blood Smear Basics," retrieved Nov. 3, 21 from https://cvm.ncsu.edu/wp-content/uploads/2016/09/Blood-Smear-Basics-2016.pdf, 18 pages.

Othman, Mazin Z., et al., "Segmentation and Feature Extraction of Lymphocytes WBC using Microscopic Images," IJERT 3(12):696-701 (Dec. 2014).

Chandradevan Ramraj et al: "Machine-based detection and classification for bone marrow aspirate differential counts: initial development focusing on nonneoplastic cells", Laboratory Investigation, Nature Publishing Group, The United States and Canadian Academy of Pathology, Inc, vol. 100, No. 1, Sep. 30, 2019 (Sep. 30, 2019), pp. 98-109, XP036966483.

Singh, Amol, and Robert S. Ohgami. "Super-resolution digital pathology image processing of bone marrow aspirate and cytology smears and tissue sections." Journal of pathology informatics 9.1 (2018) (Year: 2018).

* cited by examiner

300

FULL FIELD MORPHOLOGY—PRECISE QUANTIFICATION OF CELLULAR AND SUB-CELLULAR MORPHOLOGICAL EVENTS IN RED/WHITE BLOOD CELLS

RELATED APPLICATIONS

This application is a 371 national phase of PCT/IL2021/051329, filed Nov. 9, 2021, published as WO 2022/097155 on May 12, 2022, and claims the benefit under 35 U.S.C. § 119(e) of U.S. Provisional Patent Application No. 63/198,728, filed Nov. 9, 2020, entitled "FULL FIELD MORPHOLOGY—PRECISE QUANTIFICATION OF CELLULAR AND SUB-CELLULAR MORPHOLOGICAL EVENTS IN RED/WHITE BLOOD CELLS," which is incorporated, in its entirety, by this reference.

The subject matter of the present application is related to U.S. patent application Ser. No. 15/775,389, filed on Nov. 10, 2016, entitled "Computational microscopes and methods for generating an image under different illumination conditions", published as US20190235224, U.S. Pat. No. 10,705,326, entitled "Autofocus system for a computational microscope", and U.S. Pat. No. 10,935,779, entitled "Digital microscope which operates as a server", U.S. patent application Ser. No. 16/875,665, filed on May 15, 2020, entitled "Multi/parallel scanner", U.S. patent application Ser. No. 16/875,721, filed on May 15, 2020, entitled "Accelerating digital microscopy scans using empty/dirty area detection", published as US20200278530, U.S. Pat. No. 10,558,029, entitled "System for image reconstruction using a known pattern", the entire disclosures of which are incorporated herein by reference.

BACKGROUND

Prior approaches to analyzing cells and cellular morphology from samples such as blood samples can be less than ideal in at least some respects. For example, prior clinical standards for the review and analysis of blood samples can be based on a compromise between what would be ideal and what can be achieved by a person manually reviewing slides. This can lead to a failure to detect rare cell types and morphology structures, which can lead to a flawed diagnosis in a least some instances. Also, the statistical sampling of prior approaches can be less than ideal because of the limited number of cells that can be analyzed, and in at least some instances diagnoses are made without statistical significance.

Although efforts have been made to automate the analysis of cells, the prior automated approaches have typically analyzed fewer cells and cellular structures than would be ideal, such that the prior automated approaches suffer from shortcomings that are similar to the manual approaches in at least some respects. These shortcomings can be related to the rate at which samples can be scanned at sufficient resolution with the prior approaches, and the number of cells that can be analyzed at a sufficient rate to be used in a clinical setting.

In light of the above, it would be desirable to provide improved approaches to analyzing cells that can provide a more accurate analysis of samples to detect diseases and blood conditions. Ideally, a sufficient number of cells and cellular structures would be analyzed to increase the sensitivity of the analysis and provide statistical significance for the analysis of cell types, morphology and diseases in at least some instances.

SUMMARY

The presently disclosed systems, methods and apparatuses provide improved analysis of samples such as blood samples. In some embodiments, morphology structures of many cells such as blood cells are classified, in order to provide an improved analysis of the sample. In some embodiments, at least 10 morphology parameters are classified for at least 500 cells, which may comprise any suitable cells and cellular structures such as red blood cells, white blood cells, rare cells, inclusions and parasites. The presently disclosed systems, methods and apparatuses can provide improved detection of diseases and conditions, such as cancer, by classifying morphology structures of a suitable number of cells, which can be greater than 500 cells, such as 10,000 cells or 50,000 cells or more, and the number of classified morphology parameters can be greater than 10 per cell, such as 12 or 15 or more morphology parameters. In some embodiments, a number of cells is classified to provide statistical significance for a measured morphology parameter or cell type, which can lead to an improved diagnosis.

In some embodiments, a microscope system for full field morphology analysis comprises an optical scanning apparatus to scan the sample with an effective numerical aperture of at least 0.8, and a processor coupled to the scanning apparatus. The processor may be configured to: scan the sample with the optical scanning apparatus to produce a plurality of images of the sample, the plurality of images comprising at least 500 blood cells, analyze the plurality of images to determine at least 10 morphology parameters for each of the at least 500 blood cells, and output the at least 10 morphology parameters. The microscope system may include a display for presenting data.

INCORPORATION BY REFERENCE

All patents, applications, and publications referred to and identified herein are hereby incorporated by reference in their entirety and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The presently disclosed systems, methods and apparatuses are well suited for combination with prior approaches to analyzing samples such as blood samples. For example, the optical scanning apparatus may comprise one or more components of a conventional microscope with a sufficient numerical aperture, or a computational microscope as described in U.S. patent application Ser. No. 15/775,389, filed on Nov. 10, 2016, entitled "Computational microscopes and methods for generating an image under different illumination conditions," published as US20190235224. The system may comprise one or more components of an autofocus system, for example as described in U.S. Pat. No. 10,705,326, entitled "Autofocus system for a computational microscope". While the system may comprise any suitable user interface and data storage, in some embodiments, the system comprises one or more components for data storage and user interaction as described in U.S. Pat. No. 10,935,779, entitled "Digital microscope which operates as a server". The system may comprise one or more components of an autoloader for loading slides, for example as described in U.S. patent application Ser. No. 16/875,665, filed on May 15, 2020, entitled "Multi/parallel scanner". The system may comprise one or more components for selectively scanning areas of a sample, for example as described in U.S. patent application Ser. No. 16/875,721, filed on May 15, 2020, entitled "Accelerating digital microscopy scans using empty/dirty area detection," published as US20200278530. The system may comprise a grid with a known pattern to facilitate image reconstruction, for example as described in U.S. Pat. No. 10,558,029, entitled "System for image reconstruction using a known pattern".

Figure 1:
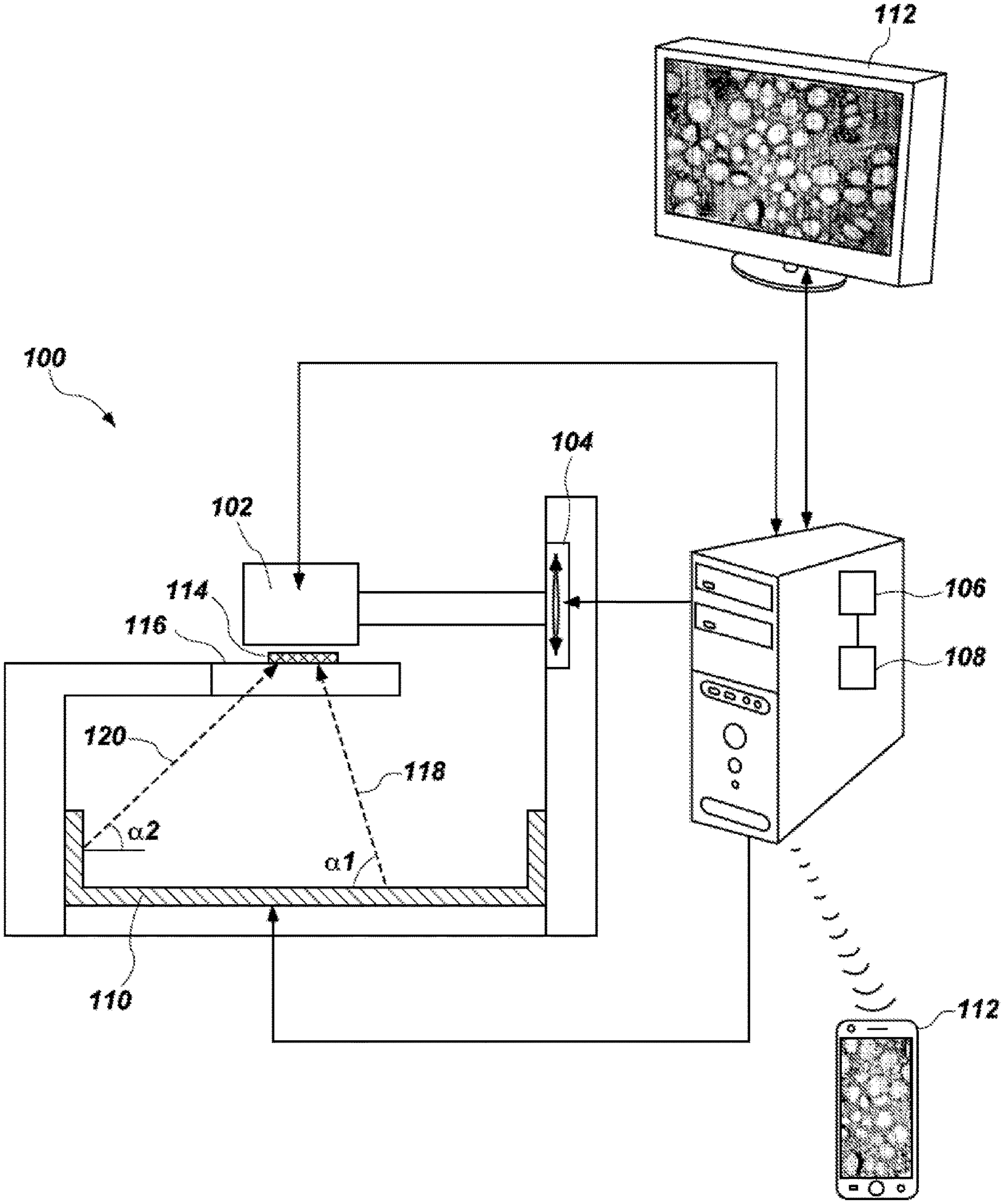
FIG. 1 shows a diagram of an exemplary microscope, in accordance with some embodiments.

FIG. 1 is a diagrammatic representation of a microscope 100 consistent with the exemplary disclosed embodiments. The term "microscope" as used herein generally refers to any device or instrument for magnifying an object which is smaller than easily observable by the naked eye, i.e., creating an image of an object for a user where the image is larger than the object. One type of microscope may be an "optical microscope" that uses light in combination with an optical system for magnifying an object. An optical microscope may be a simple microscope having one or more magnifying lens. Another type of microscope may be a "computational microscope" that comprises an image sensor and image-processing algorithms to enhance or magnify the object's size or other properties. The computational microscope may be a dedicated device or created by incorporating software and/or hardware with an existing optical microscope to produce high-resolution digital images. As shown in FIG. 1, microscope 100 comprises an image capture device 102, a focus actuator 104, a controller 106 connected to memory 108, an illumination assembly 110, and a user interface 112. An example usage of microscope 100 may be capturing images of a sample 114 mounted on a stage 116 located within the field-of-view (FOV) of image capture device 102, processing the captured images, and presenting on user interface 112 a magnified image of sample 114.

Image capture device 102 may be used to capture images of sample 114. In this specification, the term "image capture device" as used herein generally refers to a device that records the optical signals entering a lens as an image or a sequence of images. The optical signals may be in the near-infrared, infrared, visible, and ultraviolet spectrums. Examples of an image capture device comprise a CCD camera, a CMOS camera, a color camera, a photo sensor array, a video camera, a mobile phone equipped with a camera, a webcam, a preview camera, a microscope objective and detector, etc. Some embodiments may comprise only a single image capture device 102, while other embodiments may comprise two, three, or even four or more image capture devices 102. In some embodiments, image capture device 102 may be configured to capture images in a defined field-of-view (FOV). Also, when microscope 100 comprises several image capture devices 102, image capture devices 102 may have overlap areas in their respective FOVs. Image capture device 102 may have one or more image sensors (not shown in FIG. 1) for capturing image data of sample 114. In other embodiments, image capture device 102 may be configured to capture images at an image resolution higher than VGA, higher than 1 Megapixel, higher than 2 Megapixels, higher than 5 Megapixels, Megapixels, higher than 12 Megapixels, higher than 15 Megapixels, or higher than 20 Megapixels. In addition, image capture device 102 may also be configured to have a pixel size smaller than 15 micrometers, smaller than 10 micrometers, smaller than 5 micrometers, smaller than 3 micrometers, or smaller than 1.6 micrometer.

In some embodiments, microscope 100 comprises focus actuator 104. The term "focus actuator" as used herein generally refers to any device capable of converting input signals into physical motion for adjusting the relative distance between sample 114 and image capture device 102. Various focus actuators may be used, including, for example, linear motors, electrostrictive actuators, electrostatic motors, capacitive motors, voice coil actuators, magnetostrictive actuators, etc. In some embodiments, focus actuator 104 may comprise an analog position feedback sensor and/or a digital position feedback element. Focus actuator 104 is configured to receive instructions from controller 106 in order to make light beams converge to form a clear and sharply defined image of sample 114. In the example illustrated in FIG. 1, focus actuator 104 may be configured to adjust the distance by moving image capture device 102.

However, in other embodiments, focus actuator 104 may be configured to adjust the distance by moving stage 116, or by moving both image capture device 102 and stage 116. Microscope 100 may also comprise controller 106 for controlling the operation of microscope 100 according to the disclosed embodiments. Controller 106 may comprise various types of devices for performing logic operations on one or more inputs of image data and other data according to stored or accessible software instructions providing desired functionality. For example, controller 106 may comprise a central processing unit (CPU), support circuits, digital signal processors, integrated circuits, cache memory, or any other types of devices for image processing and analysis such as graphic processing units (GPUs). The CPU may comprise any number of microcontrollers or microprocessors configured to process the imagery from the image sensors. For example, the CPU may comprise any type of single- or multi-core processor, mobile device microcontroller, etc. Various processors may be used, including, for example, processors available from manufacturers such as Intel®, AMD®, etc. and may comprise various architectures (e.g., x86 processor, ARM®, etc.). The support circuits may be any number of circuits generally well known in the art, including cache, power supply, clock and input-output circuits. Controller 106 may be at a remote location, such as a computing device communicatively coupled to microscope 100.

In some embodiments, controller 106 may be associated with memory 108 used for storing software that, when executed by controller 106, controls the operation of microscope 100. In addition, memory 108 may also store electronic data associated with operation of microscope 100 such as, for example, captured or generated images of sample 114. In one instance, memory 108 may be integrated into the controller 106. In another instance, memory 108 may be separated from the controller 106.

Specifically, memory 108 may refer to multiple structures or computer-readable storage mediums located at controller 106 or at a remote location, such as a cloud server. Memory 108 may comprise any number of random-access memories, read only memories, flash memories, disk drives, optical storage, tape storage, removable storage and other types of storage.

Microscope 100 may comprise illumination assembly 110. The term "illumination assembly" as used herein generally refers to any device or system capable of projecting light to illuminate sample 114.

Illumination assembly 110 may comprise any number of light sources, such as light emitting diodes (LEDs), LED array, lasers, and lamps configured to emit light, such as a halogen lamp, an incandescent lamp, or a sodium lamp. For example, illumination assembly 110 may comprise a Kohler illumination source. Illumination assembly 110 may be configured to emit polychromatic light. For instance, the polychromatic light may comprise white light.

In some embodiments, illumination assembly 110 may comprise only a single light source. Alternatively, illumination assembly 110 may comprise four, sixteen, or even more than a hundred light sources organized in an array or a matrix. In some embodiments, illumination assembly 110 may use one or more light sources located at a surface parallel to illuminate sample 114. In other embodiments, illumination assembly 110 may use one or more light sources located at a surface perpendicular or at an angle to sample 114.

In addition, illumination assembly 110 may be configured to illuminate sample 114 in a series of different illumination conditions. In one example, illumination assembly 110 may comprise a plurality of light sources arranged in different illumination angles, such as a two-dimensional arrangement of light sources. In this case, the different illumination conditions may comprise different illumination angles. For example, FIG. 1 depicts a beam 118 projected from a first illumination angle $\alpha$1, and a beam 120 projected from a second illumination angle $\alpha$2. In some embodiments, first illumination angle $\alpha$1 and second illumination angle $\alpha$2 may have the same value but opposite sign. In other embodiments, first illumination angle $\alpha$1 may be separated from second illumination angle $\alpha$2. However, both angles originate from points within the acceptance angle of the optics. In another example, illumination assembly 110 may comprise a plurality of light sources configured to emit light in different wavelengths. In this case, the different illumination conditions may comprise different wavelengths. For instance, each light source may be configured to emit light with a full width half maximum bandwidth of no more than 50 nm so as to emit substantially monochromatic light. In yet another example, illumination assembly 110 may be configured to use a number of light sources at predetermined times. In this case, the different illumination conditions may comprise different illumination patterns. For example, the light sources may be arranged to sequentially illuminate the sample at different angles to provide one or more of digital refocusing, aberration correction, or resolution enhancement. Accordingly and consistent with the present disclosure, the different illumination conditions may be selected from a group including: different durations, different intensities, different positions, different illumination angles, different illumination patterns, different wavelengths, or any combination thereof.

Although reference is made to computational microscopy, the presently disclosed systems and methods are well suited for use with many types of microscopy and microscopes such as one or more of a high definition microscope, a digital microscope, a scanning digital microscope, a 3D microscope, a phase imaging microscope, a phase contrast microscope, a dark field microscope, a differential interference contrast microscope, a light-sheet microscope, a confocal microscope, a holographic microscope, or a fluorescence-based microscope.

In some embodiments, image capture device 102 may have an effective numerical aperture ("NA") of at least 0.8. In some embodiments, the effective NA corresponds to a resolving power of the microscope that has the same resolving power as an objective lens with that NA. Image capture device 102 may also have an objective lens with a suitable NA to provide the effective NA, although the NA of the objective lens may be less than the effective NA of the microscope. For example, the imaging apparatus may comprise a computational microscope to reconstruct an image from a plurality of images captured with different illumination angles as described herein, in which the reconstructed image corresponds to an effective NA that is higher than the NA of the objective lens of the image capture device. In some embodiments with conventional microscopes, the NA of the microscope objective corresponds to the effective NA of the images. The lens may comprise any suitable lens such as an oil immersion lens or a non-oil immersion lens.

Consistent with disclosed embodiments, microscope 100 may comprise, be connected with, or in communication with (e.g., over a network or wirelessly, e.g., via Bluetooth) user interface 112. The term "user interface" as used herein generally refers to any device suitable for presenting a magnified image of sample 114 or any device suitable for receiving inputs from one or more users of microscope 100. FIG. 1 illustrates two examples of user interface 112. The first example is a smartphone or a tablet wirelessly communicating with controller 106 over a Bluetooth, cellular connection or a Wi-Fi connection, directly or through a remote server. The second example is a PC display physically connected to controller 106. In some embodiments, user interface 112 may comprise user output devices, including, for example, a display, tactile device, speaker, etc. In other embodiments, user interface 112 may comprise user input devices, including, for example, a touchscreen, microphone, keyboard, pointer devices, cameras, knobs, buttons, etc. With such input devices, a user may be able to provide information inputs or commands to microscope 100 by typing instructions or information, providing voice commands, selecting menu options on a screen using buttons, pointers, or eye-tracking capabilities, or through any other suitable techniques for communicating information to microscope 100. User interface 112 may be connected (physically or wirelessly) with one or more processing devices, such as controller 106, to provide and receive information to or from a user and process that information. In some embodiments, such processing devices may execute instructions for responding to keyboard entries or menu selections, recognizing and interpreting touches and/or gestures made on a touchscreen, recognizing and tracking eye movements, receiving and interpreting voice commands, etc.

Microscope 100 may also comprise or be connected to stage 116. Stage 116 comprises any horizontal rigid surface where sample 114 may be mounted for examination. Stage 116 may comprise a mechanical connector for retaining a slide containing sample 114 in a fixed position. The mechanical connector may use one or more of the following: a mount, an attaching member, a holding arm, a clamp, a clip, an adjustable frame, a locking mechanism, a spring or any combination thereof. In some embodiments, stage 116 may comprise a translucent portion or an opening for allowing light to illuminate sample 114. For example, light transmitted from illumination assembly 110 may pass through sample 114 and towards image capture device 102. In some embodiments, stage 116 and/or sample 114 may be moved using motors or manual controls in the XY plane to enable imaging of multiple areas of the sample.

Laboratory tests that measure cellular abnormalities as part of disease diagnostic protocols may be divided into two main investigational axes: molecular tests and protein tests. In the molecular axis, a span of technologies from NGS to PCR and its derivatives may analyze specific nucleic acid sequences. In the protein axis, fluorescence flow cytometry enables the identification of internal and external cell proteins. Although morphological parameters (e.g. percentage of blasts in acute leukemias) may be utilized as diagnostic criteria, the capacity and sensitivity of this modality may previously have been limited.

The present disclosure provides for a Full Field Morphology ("FFM") test which allows analysis on a large number of cells, enables precise quantification of morphological parameters, detects morphological events at high sensitivity, and generates quantitative reports based on cellular and subcellular morphological characteristics. FFM tests may yield new independent data to current morphological analysis, without the need to identify specific targets or lay a-priori clinical assumptions. The data may support the findings from other investigational axes or may complete them by shedding new light on new thinking directions. In FFM analysis, a large number of cells (e.g., thousands or more) may be analyzed, and cellular and subcellular visual indicators may be measured and quantified. The data may be gathered from one or multiple slides. The FFM may also improve the accessibility of these tests due to significantly lowering the price per test.

Figure 2:
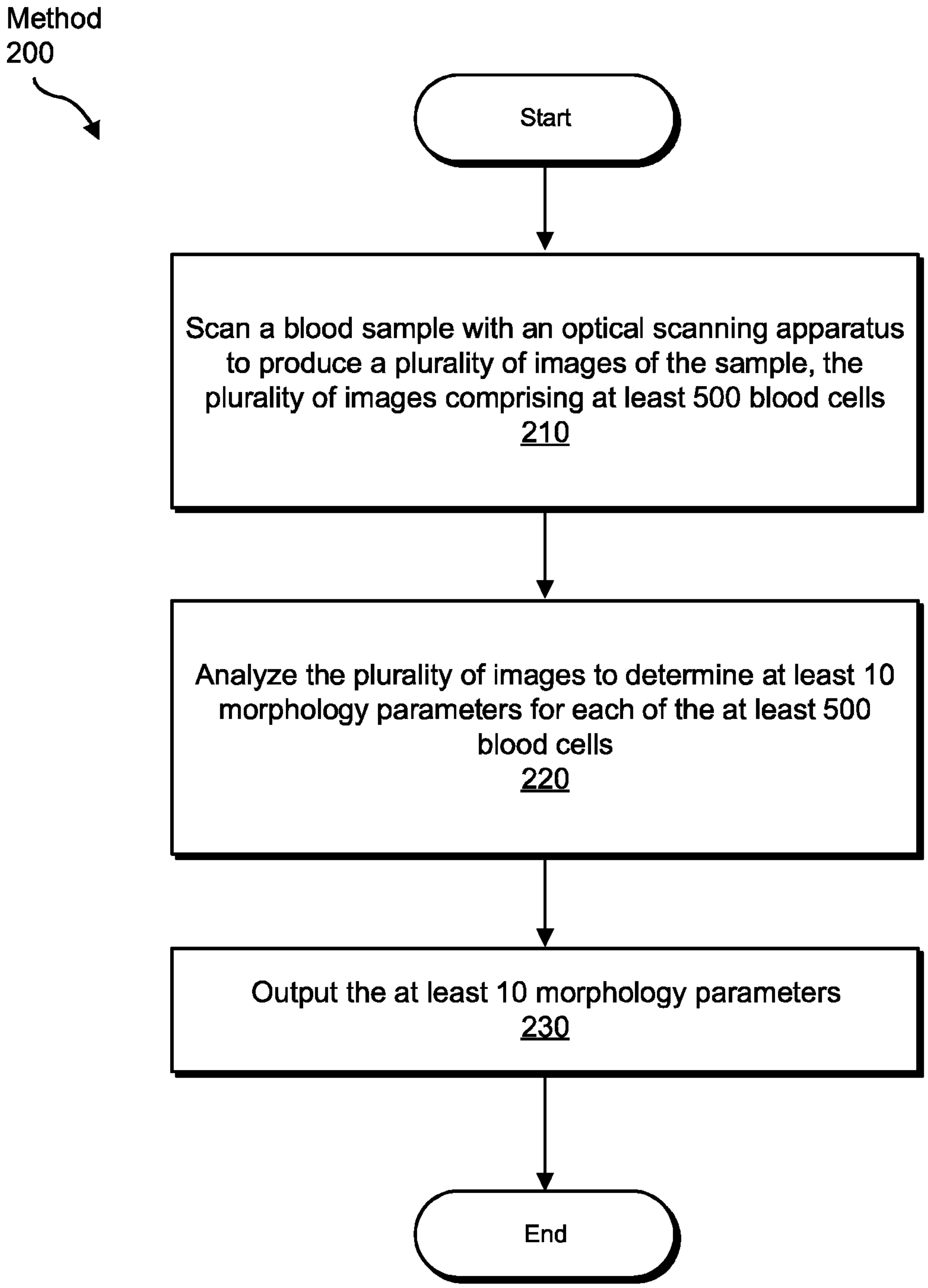
FIG. 2 shows a flow chart of an exemplary method, in accordance with some embodiments.

FIG. 2 is a flow diagram of an exemplary computer-implemented method 200 for FFM analysis. The steps shown in FIG. 2 may be performed by a full field morphology testing system, such as the system(s) illustrated in FIGS. 1, 6, and/or 7. In one example, each of the steps shown in FIG. 2 may represent an algorithm whose structure includes and/or is represented by multiple sub-steps, examples of which will be provided in greater detail below.

As illustrated in FIG. 2, at step 210 one or more of the systems described herein may scan a blood sample with an optical scanning apparatus comprising an effective numerical aperture of at least 0.8. The optical scanning apparatus may produce a plurality of images of the sample as image data. The plurality of images may comprise at least 500 blood cells. For example, microscope 100 (e.g., image capture device 102) may scan sample 114 which may correspond to a blood sample with at least 500 blood cells.

The sample may correspond to various types of samples and/or various types of cells. In some embodiments, the blood sample may comprise one or more of a peripheral blood smear, a bone marrow aspirate smear, a body fluid smear, a whole blood sample or a processed blood sample. The sample can be supported and analyzed in many ways, for example with one or more of a slide, a container or a cavity. For example, the sample may comprise a blood smear on a slide, and the scanning apparatus may be configured to scan one or more of a body, a monolayer of cells or a feathered edge of the blood smear. In some embodiments, the processor may be configured to classify at least half of the at least 500 blood cells from the monolayer.

In some embodiments, the at least 500 blood cells may comprise at least 1000 blood cells, optionally at least blood 2000 cells, optionally at least blood 5000 cells, optionally at least blood 10,000 cells, optionally at least 20,000 blood cells, optionally at least 50,000 blood cells, optionally at least 100,000 blood cells, or optionally at least 150,000 white blood cells.

In some embodiments, the at least 500 blood cells may comprise at least 500 white blood cells ("WBCs"). For example, the sample may comprise at least 1000 white blood cells and optionally at least 1500 WBCs, optionally at least 2000 WBCs, optionally at least 5000 WBCs, or optionally at least 10,000 WBCs.

In some embodiments, the sample may comprise at least 2,000 red blood cells ("RBCs"), optionally at least 10,000 RBCs, optionally at least 50,000 RBCs, optionally at least 100,000 RBCs, or optionally at least 150,000 RBCs.

In order for a full field morphology testing system described herein to be viable, such a system may perform with reasonable scanning times. For example, the processor and the optical scanning apparatus may be configured to scan an area of the sample at a scan rate to generate image data corresponding to at least 1000 cells per second. In other examples, the scan rate may be within a range from 0.3 $mm^2$ per second to 10 $mm^2$ per second, optionally from 0.3 $mm^2$ per second to 4 $mm^2$ per second, or optionally from 1 $mm^2$ per second to 10 $mm^2$ per second.

The systems described herein may further process multiple samples. For example, the optical scanning apparatus and the processor may be configured to process a plurality of samples at a rate of at least 15 samples per hour, optionally at least 20 samples per hour, optionally at least 25 samples per hour at least 30 samples per hour, optionally at least 35 samples per hour, or optionally at least 40 samples per hour.

A scan area may be large enough to allow for detecting the existence of even a few clinical events anywhere on the slide of the sample. For example, a scanned area of the sample may comprise at least 1.0 $cm^2$, optionally at least 2 $cm^2$, optionally at least 5 $cm^2$, optionally at least 10 $cm^2$, or optionally at least 15 $cm^2$. In other examples, the scanned area of the sample may be within a range from about 1.0 $cm^2$ to about 15 $cm^2$.

In some embodiments, the area may comprise at least 0.4 $cm^2$ and an optical resolution of an image of the area may be within a range from about 200 nm to about 500 nm and optionally within a range from about 200 nm to about 400 nm. In some embodiments, a pixel resolution of the image of the area may be within a range from about 100 nm to about 250 nm and optionally within a range from about 100 nm to about 200 nm.

The scan area may comprise a plurality of areas. The plurality of areas may be scanned at the scan rate to generate the image data from the plurality of areas. In some embodiments, the area may be scanned with the optical scanner to generate a first plurality of images with a first spatial resolution. The first plurality of images may be processed to generate a second plurality of images with a second spatial resolution greater than the first spatial resolution. The second plurality of images may be processed to generate morphology parameters as will be further described below.

In some embodiments, the optical scanning apparatus may comprise one or more lenses with a numerical aperture for an image of the sample formed on a sensor array of the optical scanning apparatus. The numerical aperture may be less than the effective numerical aperture. For example, the effective numerical aperture may comprise a value of at least 0.9 and optionally at least 1.0. In other examples, the effective numerical aperture may be within a range from about 0.9 to about 1.5.

At step 220 one or more of the systems described herein may analyze, with a processor, the plurality of images to determine at least 10 morphology parameters for each of the at least 500 blood cells. For example, microscope 100 (e.g., controller 106 and/or memory 108) may analyze the plurality of images.

In some embodiments, the at least 10 morphology parameters may comprise one or more of cell type, a cell inclusion, a cell subpopulation, a distribution of cellular parameters across a population of cells, or a distribution of cells across a sub-population.

In some embodiments, the at least 10 morphology parameters may comprise 10 or more of a red blood cell ("RBC") parameter, a white blood cell ("WBC") parameter, a WBC subclass parameter, a WBC cytoplasm segmentation parameter, a WBC cytoplasm contour parameter, a WBC cytoplasm texture parameter, a WBC nucleus segmentation parameter, a WBC nucleus contour parameter, a WBC nucleus texture parameter, a WBC nucleus parameter, a WBC nucleoli parameter, a RBC subclass parameter, a RBC external contour parameter, a RBC internal white pallor parameter, a RBC internal contour parameter, a RBC cell shape parameter, a platelet parameter, a platelet contour parameter, a platelet granulation parameter, a platelet texture parameter, a non-hematological cell parameter, a circulating tumor cell (CTC) parameter, a circulating lymphoma parameter, a circulating plasma cell parameter, a cell inclusion parameter, an Auer rod parameter, a Dohle bodies parameter, a parasite parameter, a lymphocyte cytoplasm blue shift parameter, a lymphocyte cytoplasm granule parameter, a neutrophil nucleus blob parameter, a monocyte cytoplasm vacuole parameter, an eosinophil cytoplasmic granulation parameter, a basophil cytoplasm granulation parameter, a smudge cell area parameter, a white blood cell nucleus opacity parameter, an RBC paleness parameter, a cell area parameter, a cell contour length parameter, a white blood cell nucleus contour length parameter, a red blood cell redness parameter, a platelet granulation parameter, an inclusion parameter for an inclusion detected within the cell, a megakaryocyte cellular area to cytoplasm area parameter, a plasma cell area to Golgi area parameter, a low density neutrophil (LDN) parameter, a high density neutrophil (HDN) parameter, a hemoglobin per RBC parameter, a volume per cell parameter, a dry mass per cell parameter, or a cell surface area estimation parameter.

In some embodiments, the at least 10 morphology parameters may comprise 10 or more internal cellular structure parameters comprising one or more of a WBC cytoplasm segmentation parameter, a WBC cytoplasm contour parameter, a WBC cytoplasm texture parameter, a WBC nucleus segmentation parameter, a WBC nucleus contour parameter, a WBC nucleus texture parameter, a WBC nucleus parameter, a WBC nucleoli parameter, a RBC internal white pallor parameter, or a RBC internal contour parameter and optionally wherein the 10 or more internal cellular parameters correspond to inclusions of the at least 500 cells.

For example, in embodiments where the at least 500 blood cells comprise at least 500 white blood cells, the processor may be configured to determine the at least 10 morphology parameters for each of the at least 500 white blood cells.

In some embodiments, the at least 10 morphology parameters may comprise at least 12 morphology parameters, optionally at least 15 morphology parameters, optionally at least 20 morphology parameters, optionally at least 25 morphology parameters, or optionally at least 30 morphology parameters.

In some embodiments, the at least 10 morphology parameters per cell may comprise at least 16 morphology parameters per cell and optionally at least about 20 morphology parameters per cell, at least 50 morphology parameters per cell, or at least 100 morphology parameters per cell.

In some embodiments, the image data may be processed with artificial intelligence, such as one or more of a neural network or a machine learning classifier to generate the 10 or more morphology parameters and optionally wherein the neural network comprises a convolutional neural network.

The artificial intelligence used to classify the morphological parameters may be configured in any suitable way in accordance with the present disclosure. In some embodiments, the artificial intelligence may comprise a neural network classifier, e.g. a convolutional neural network, or a machine learning classifier, for example. The classifier may include one or more models such as a neural network, a convolutional neural network, decision trees, support vector machines, regression analysis, Bayesian networks, and/or training models. The classifier may be configured to classify the at least 10 morphology parameters as described herein with any of the aforementioned approaches. In some embodiments, the classifier may comprise a convolutional neural network with several cascaded layers for detection and segmentation. In some embodiments, the classifier may comprise a binary classification parameter or a multi-level classification parameter. The various steps may be performed sequentially or in parallel. For example, cell types may be classified, and then cellular morphology parameters classified based on a cell type. In some embodiments, a plurality of morphology parameters may be classified and output to determine cell type, and additional morphology parameters may be selected and classified based on cell type. In some embodiments, groups of cells or morphology parameters may be classified, and these groups may further be classified into subgroups, which may be used to classify other subgroups. In some embodiments cellular structures may be segmented to provide segmented cellular images. Alternatively, cells and morphology parameters may be classified without segmentation. In some embodiments, combinations of logical operations may be performed on the output morphology parameters to determine additional morphology parameters to classify and associated processes, such as logical operations related to detected morphology structures. A person of ordinary skill in the art in of artificial intelligence will recognize many adaptations and variations for classifying and determining morphology parameters in accordance with the present disclosure.

In some embodiments, the image data may be processed while the sample is scanned with the scanning apparatus. Further, in some embodiments, the image data may be processed while a slide supporting the sample is loaded into the optical scanning apparatus to view the sample.

At step 230 one or more of the systems described herein may output the at least morphology parameters. For example, microscope 100 (e.g., controller 106 and/or memory 108) may output the morphology parameters for further processing and/or display via user interface 112.

For example, microscope 100 (e.g., user interface 112) may further comprise a display configured to present the cell data. The display may be configured to present morphological parameters of a cell and an image of a cell simultaneously on a display for a user to verify a type of the cell (see, e.g., FIG. 3B as will be described further below).

In some embodiments, the processor may be configured to output the at least morphology parameters for each of the cells, for example for each of the at least 500 white blood cells.

In some embodiments the processor may be configured to output the at least 10 morphology parameters per cell at an output rate corresponding to the at least 1000 cells per second. In some embodiments, the output rate may correspond to at least 2000 cells per second, optionally 5000 cells per second, or optionally at least 1000 cells per second.

In some embodiments, an area of the blood sample may be scanned at a scan rate to generate image data while the at least 10 morphology parameters are generated at the output rate.

As described herein, the area may comprise a plurality of areas, such that the plurality of areas is scanned at the scan rate to generate the image data from the plurality of areas and the output is generated at the output rate while the plurality of areas is scanned. In some embodiments, the area may be scanned with the optical scanner to generate a first plurality of images with a first spatial resolution. The first plurality of images may be processed to generate a second plurality of images with a second spatial resolution greater than the first spatial resolution. The second plurality of images may be processed to generate the at least 10 morphology parameters per cell.

In some embodiments, the processor may be configured to adjust the scan rate in response to the output rate. In some embodiments, the processor may be configured to adjust the output rate in response to the scan rate. In addition, the systems described herein may further comprise a balancer to adjust the scan rate or the output rate to correspond to within about 50% of each other. In some embodiments, the scan rate and the output rate may correspond to within about 50% of each other and optionally to within about 25% of each other.

In some embodiments, the processor may be configured to provide a decision support system for the user to view a graphical presentation of cell data. The decision support system may be configured for the user to interact with the cell data and view images and classifications of the at least 500 cells and to override a classification of a cell by inputting a different classification of the cell.

Figure 3A:
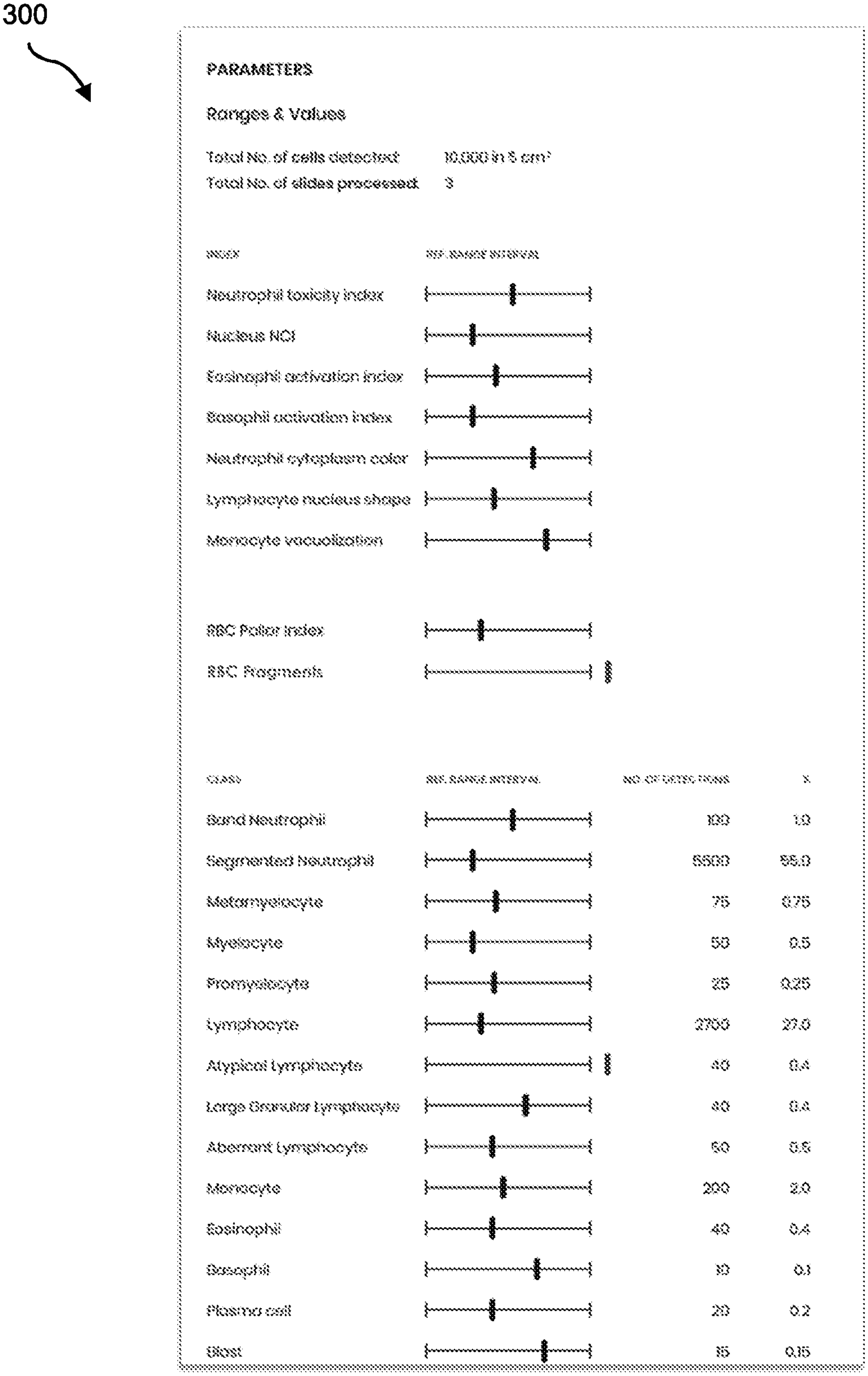
FIGS. 3A-B show an example red blood cell analysis interface, in accordance with some embodiments.

For example, the processor may be configured to display statistical data for the at least 500 cells. The statistical data may comprise one or more of a comparison of detected cell data over an area of the blood sample with predefined baseline values, an analysis of the distribution of values of classes of cells, or an analysis of ratios of classes of cells. FIG. 3A shows a chart 300 of statistical data organized by parameters.

Figure 3B:
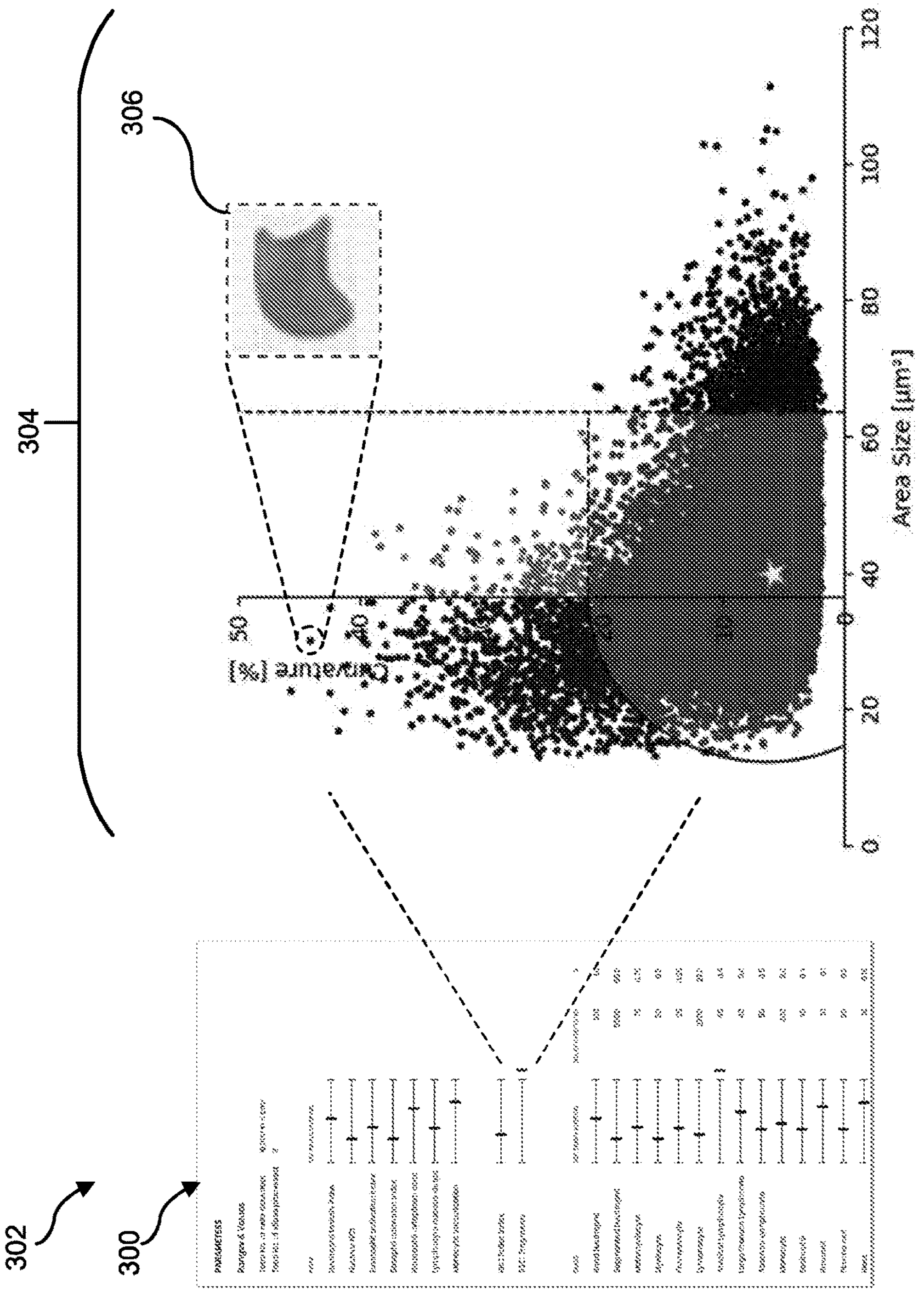

In some embodiments, the processor may be configured to display a scatter plot of cell types for the at least 500 cells. For example, FIG. 3B shows a graph 304 including a scatter plot.

In some embodiments, a first axis of the scatter plot may correspond to a first morphology parameter of the at least 10 morphology parameters and a second axis of the scatter plot may correspond to a second morphology parameter of the at least 10 morphology parameters. Moreover, in some embodiments, the at least 500 cells in the scatter plot may comprise at least 1000 cells.

In some embodiments, the processor may be configured to receive an input from a user to select the first morphology parameter of the at least 10 morphology parameters and the second morphology parameter of the at least 10 morphology parameters. The processor may optionally be configured to allow the user to select from at least 20 morphology parameters to select the first morphology parameter and the second morphology parameter in order to define the first axis and the second axis of the scatter plot.

In some embodiments, the processor may be configured to provide a report for the at least 500 cells. The report may comprise one or more of a differential interactive graph configured to change in response to user input which, in some examples, may further include an image of a corresponding detected cell (see, e.g., graph 400 in FIG. 4), a subcellular interactive graph comprising percentages and number of subcellular structures (see, e.g., FIG. 3A), or an annotated image showing annotations for each of the at least 500 cells at a plurality of locations corresponding to locations of the at least 500 cells from the image.

In some embodiments, the processor may be configured to receive an input corresponding to one or more of a confidence interval or a p-value for one or more of a cell type or a cell morphology. The processor may be configured to determine a number of cells to classify in response to the input and optionally wherein the number of cells comprises at least 50,000 cells and further optionally at least 100,000 cells.

In one example, with reference to FIGS. 3A-B, the decision support system may display statistical data relating to various parameters in chart 300. The user may select a parameter for additional data, as seen in display 302 in FIG. 3B. For example, the user may select "RBC Fragments" to expand a corresponding graph 304 of a scatter plot correlating size and curvature of cell fragments. The user may further expand a specific data point to see an image 306 from the sample corresponding to the selected data point.

In some embodiments, the systems described herein may further process the morphology parameters to detect certain events. In some embodiments, the processor may be configured to combine the least 10 morphology parameters to detect a rare white blood cell in a population of WBCs with a sensitivity of less than 1 cell per 100 cells, optionally 1 cell per 500 cells, optionally 1 cell per 1000 cells, optionally 1 cell per 10,000 cells, optionally 1 cell per 50,000 cells, or optionally 1 cell per 100,000 cells. The rare white blood cell may comprise one or more of a plasma cell, a circulating lymphoma cell, a blast cell, an immature cell, a hairy cell, a binucleated cell ("buttocks cell"), a Sezary cell, or a cup-like blast.

In some embodiments, the processor may be configured to combine the plurality of at least 10 morphology parameters to detect a rare morphological event of a white blood cell in a population of WBCs with a sensitivity of less than 1 even per 100 cells, optionally 1 event per 500 cells, optionally 1 event per 1000 cells, optionally 1 event per 10,000 cells, optionally 1 event per 50,000 cells, or optionally 1 event per 100,000 cells.

Figure 5B:
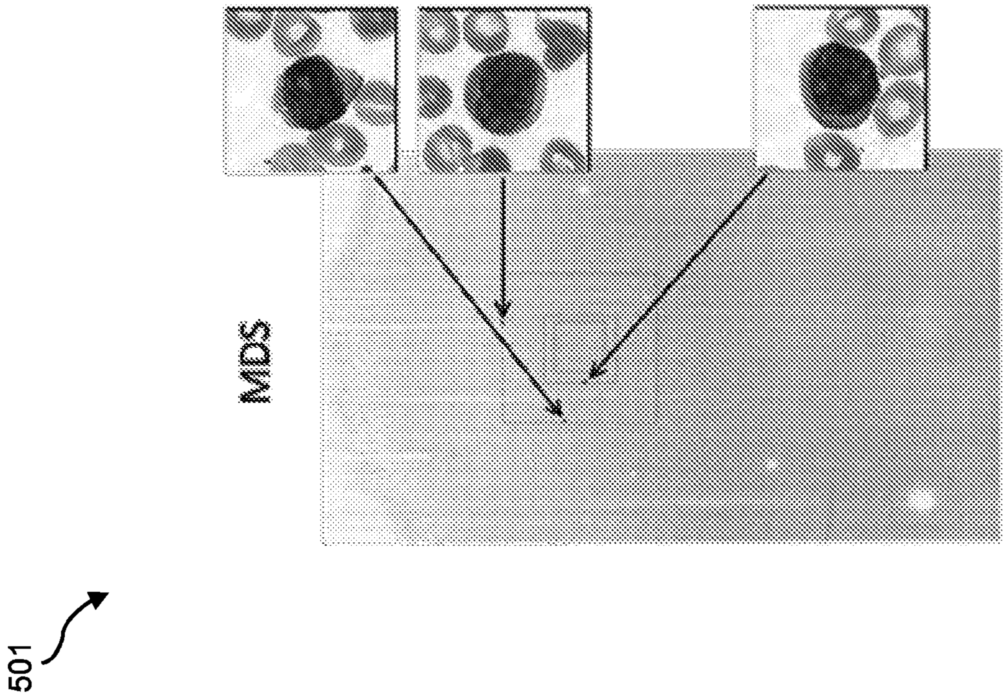
FIGS. 5A-B shows example images of rare cells, in accordance with some embodiments.
Figure 5A:
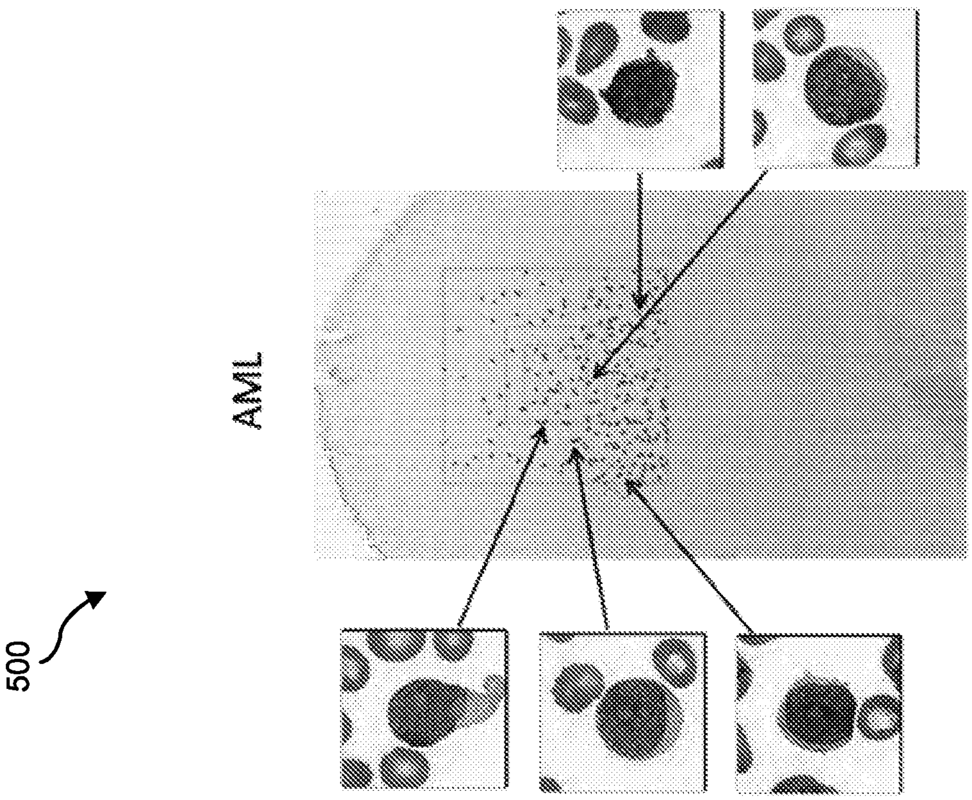

FIG. 5A illustrates an image 500 of rare cells (e.g., blasts) detected in a sample for acute myeloid leukemia (AML).

The rare cells may be somewhat prevalent (as compared to FIG. 5B) but in an acute state. FIG. 5B illustrates an image 501 of rare cells detected in a sample for myelodysplastic syndrome (MDS). As seen in FIG. 5B, the rare cells may be extremely rare (e.g., as compared to FIG. 5A). The systems and methods described herein may advantageously allow detection of such rare cells at a sensitivity described above, by increasing a number of cells that can be analyzed, as described herein.

In some embodiments, the rare morphological event may comprise one or more of a rare cell, a rare inclusion in a cell, an inclusion in a rare cell, Auer rods, Dohle bodies, a parasite, a plasma cell, a circulating lymphoma cell, a blast cell, or an immature cell.

In some embodiments, the processor may be configured with instructions to detect a minimum residual disease ("MRD") in response to the plurality of at least 10 morphology parameters. The at least 500 cells may comprise at least 10,000 cells, and the at least 500 cells may comprise one or more of plasma cells or blasts and optionally the one or more of plasma cells or blasts may be shown with a marking on an image of an area of the blood sample or a scatter plot comprising cell data for the at least 10,000 cells (see, e.g., FIG. 3B).

Figure 4:
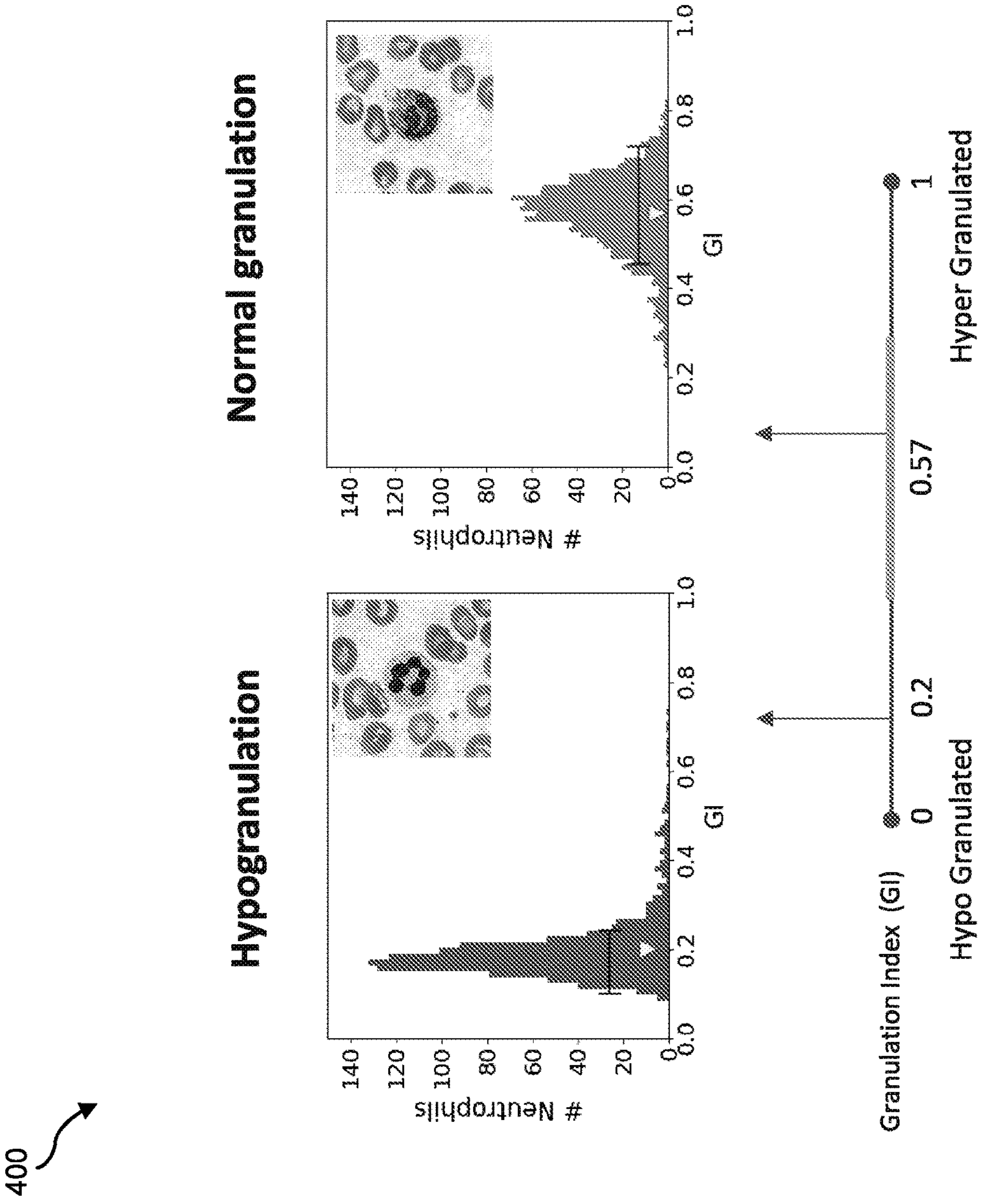
FIG. 4 shows an example granulation measurement, in accordance with some embodiments.

In some embodiments, the processor may be configured to determine a cytoplasm toxicity for at least 1000 neutrophils in response to an amount of granulation for each of the at least 1000 neutrophils and optionally the cytoplasm toxicity may comprise a granulation index (see, e.g., FIG. 4).

In some embodiments, the processor may be configured to detect Auer rods and nucleoli of the at least 500 cells and to present a report for each cell comprising Auer rods, the report comprising metrics of the Auer rods and an image of the cell comprising the Auer rods.

In some embodiments, the processor may be configured to present one or more of a lymphocyte cytoplasm blue shift distribution for a plurality of lymphocytes, a lymphocyte cytoplasmic granules distribution for a plurality of lymphocytes, a neutrophils number of nucleus lobes distribution for a plurality of neutrophils, a monocytes cytoplasmic vacuoles distribution for a plurality of monocytes, an eosinophils cytoplasmic granulation distribution for a plurality of eosinophils, a basophils cytoplasmic granulation distribution for a plurality of basophils, a smudge cells area distribution for a plurality of smudge cells, a WBC nucleus opacity level distribution for a plurality of WBCs, a ratio of RBC white palar area to RBC area distribution for a plurality of RBCs, a RBC area distribution for a plurality of RBCs, a WBC area distribution for a plurality of RBCs, a Platelet area distribution for a plurality of platelets, a RBC contour length distribution for a plurality of RBCs, a WBC contour length distribution for a plurality of WBCs, a platelet contour length distribution for a plurality of WBCs, a WBC nucleus contour length distribution for a plurality of WBC nuclei, a RBC redness level distribution for a plurality of RBCs, a platelets granulation distribution for a plurality of platelets, a high sensitive cells inclusions, a ratio of inclusion area to total cellular area, a number of detected parasites, a parasite detected as an inclusion in a blood cell a megakaryocyte cell area to cytoplasm area ratio distribution for a plurality of megakaryocytes, or a plasma cells Golgi area to plasma cells area ratio distribution for a plurality of megakaryocytes.

Figure 6:
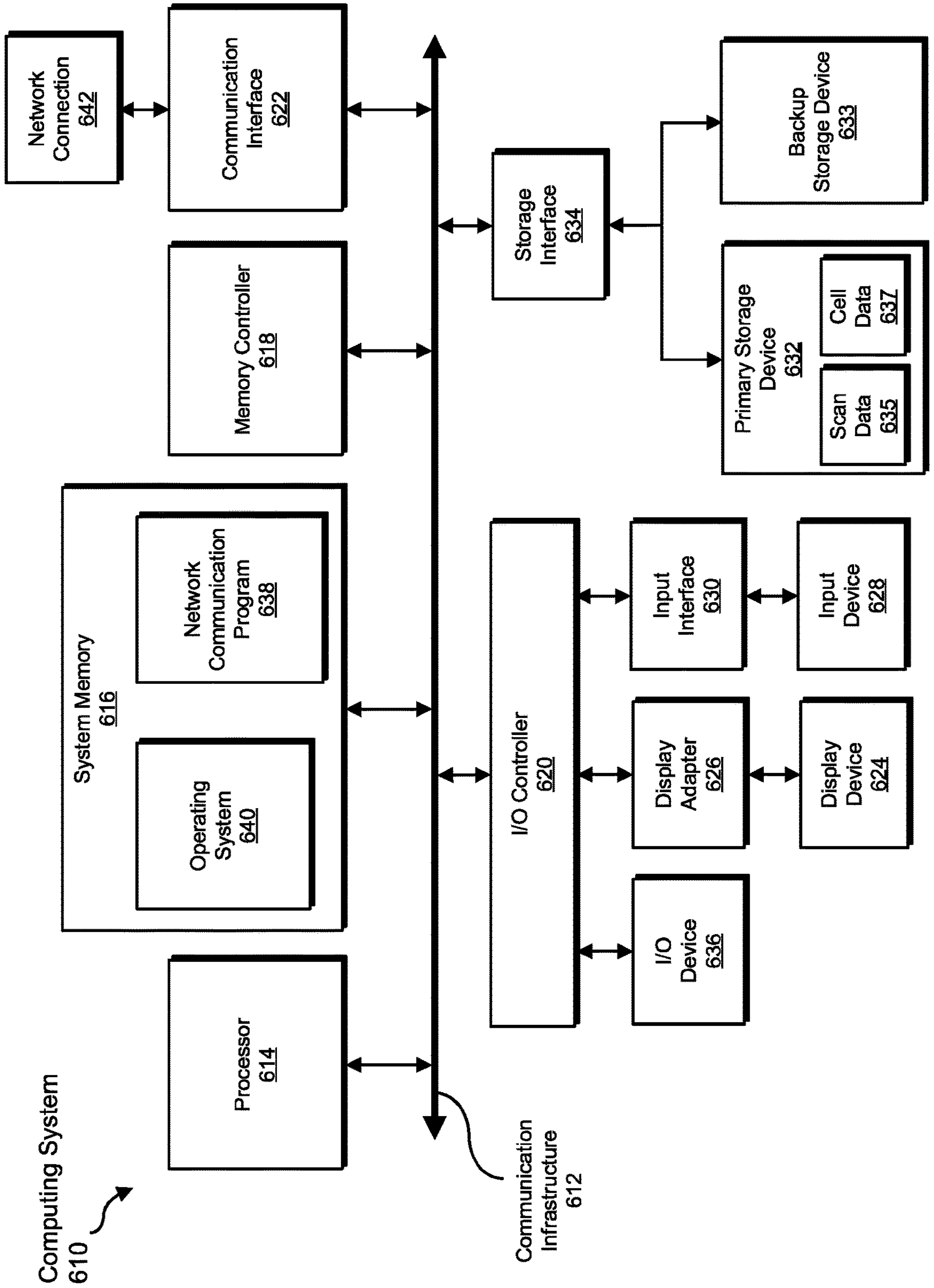
FIG. 6 shows an exemplary computing system, in accordance with some embodiments.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 2). All or a portion of computing system 610 may also perform and/or be a means for performing any other steps, methods, or processes described and/or illustrated herein. All or a portion of computing system 610 may correspond to or otherwise be integrated with microscope 100 (e.g., one or more of controller 106, memory 108, and/or user interface 112).

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of steps from FIG. 2 may be computer instructions that may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 (which may correspond to user interface 112) coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 (which may correspond to user interface 112) coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, scan data 635 (which may correspond to the scan data described herein) and/or cell data 637 (which may correspond to the cell data described herein) may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
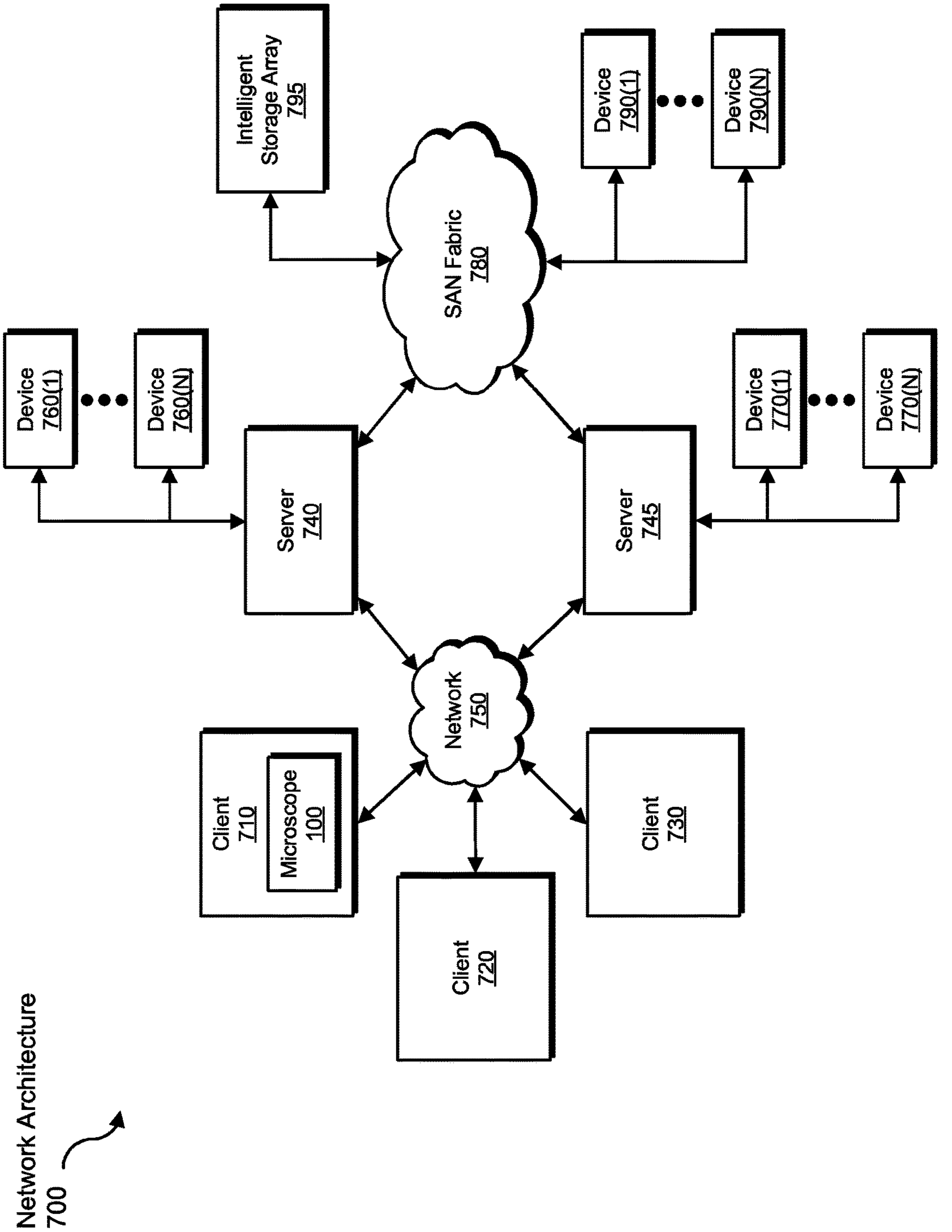
FIG. 7 shows an exemplary network architecture, in accordance with some embodiments.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 2). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of microscope 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for bone marrow aspirate analysis.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor. The processor may comprise a distributed processor system, e.g. running parallel processors, or a remote processor such as a server, and combinations thereof.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein. Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

As used herein, the terms "comprise" and "include" are interchangeable.

As used herein, the terms "in response to" and "based on" are interchangeable.

The present disclosure includes the following numbered clauses.

Clause 1. A system for imaging and analyzing a blood sample, the system comprising an optical scanning apparatus to scan the sample with an effective numerical aperture of at least 0.8; a processor coupled to the scanning apparatus and configured to: scan the sample with the optical scanning apparatus to produce a plurality of images of the sample, the plurality of images comprising at least 500 blood cells; analyze the plurality of images to determine at least 10 morphology parameters for each of the at least 500 blood cells; and output the at least 10 morphology parameters.

Clause 2. The system of clause 1, wherein the at least 500 blood cells comprise at least 500 white blood cells and the processor is configured to determine the at least 10 morphology parameters for each of the at least 500 white blood cells.

Clause 3. The system of clause 2, wherein the processor is configured to output the at least 10 morphology parameters for each of the at least 500 white blood cells.

Clause 4. The system of clause 2, wherein the sample comprises at least 1000 white blood cells ("WBCs") and optionally at least 1500 WBCs, optionally at least 2000 WBCs, optionally at least 5000 WBCs, or optionally at least 10,000 WBCs.

Clause 5. The system of clause 1, wherein the sample comprises at least 2,000 red blood cells ("RBCs"), optionally at least 10,000 RBCs, optionally at least 50,000 RBCs, optionally at least 100,000 RBCs, or optionally at least 150,000 RBCs.

Clause 6. The system of clause 1, wherein the optical scanning apparatus and the processor are configured to process a plurality of samples at a rate of at least 15 samples per hour, optionally at least 20 samples per hour, optionally at least 25 samples per hour at least 30 samples per hour, optionally at least 35 samples per hour, or optionally at least 40 samples per hour.

Clause 7. The system of clause 1, wherein the at least 10 morphology parameters comprise at least 12 morphology parameters, optionally at least 15 morphology parameters, optionally at least 20 morphology parameters, optionally at least 25 morphology parameters, or optionally at least 30 morphology parameters.

Clause 8. The system of clause 1, wherein the processor and the optical scanning apparatus are configured to scan an area of the sample at a scan rate to generate image data corresponding to at least 1000 cells per second.

Clause 9. The system of clause 8, wherein the processor is configured to output the at least 10 morphology parameters per cell at an output rate corresponding to the at least 1000 cells per second.

Clause 10. The system of clause 1, further comprising a display configured to present cell data.

Clause 11. The system of clause 1, wherein the at least 10 morphology parameters comprise one or more of cell type, a cell inclusion, a cell subpopulation, a distribution of cellular parameters across a population of cells, or a distribution of cells across a sub-population.

Clause 12. The system of clause 1, further comprising a display configured to present morphological parameters of a cell and an image of a cell simultaneously on a display for a user to verify a type of the cell.

Clause 13. The system of clause 1, wherein an area of the blood sample is scanned at a scan rate to generate image data while the at least 10 morphology parameters are generated at an output rate.

Clause 14. The system of clause 13, wherein the area comprises a plurality of areas, and wherein the plurality of areas is scanned at the scan rate to generate the image data from the plurality of areas and the output is generated at the output rate while the plurality of areas is scanned.

Clause 15. The system of clause 13, wherein the area is scanned with the optical scanning apparatus to generate a first plurality of images with a first spatial resolution and wherein the first plurality of images is processed to generate a second plurality of images with a second spatial resolution greater than the first spatial resolution and wherein the second plurality of images is processed to generate the at least 10 morphology parameters per cell.

Clause 16. The system of clause 13, wherein the scan rate and the output rate to correspond to within about 50% of each other and optionally to within about 25% of each other.

Clause 17. The system of clause 13, wherein the area comprises at least 0.4 cm2 and an optical resolution of an image of the area is within a range from about 200 nm to about 500 nm and optionally within a range from about 200 nm to about 400 nm.

Clause 18. The system of clause 17, wherein a pixel resolution of the image of the area is within a range from about 100 nm to about 250 nm and optionally within a range from about 100 nm to about 200 nm.

Clause 19. The system of clause 18, wherein the scan rate is within a range from 0.3 mm2 per second to 10 mm2 per second, optionally from 0.3 mm2 per second to 4 mm2 per second, or optionally from 1 mm2 per second to 10 mm2 per second.

Clause 20. The system of clause 1, wherein the at least 500 blood cells comprise at least 1000 blood cells, optionally at least blood 2000 cells, optionally at least blood 5000 cells, optionally at least blood 10,000 cells, optionally at least 20,000 blood cells, optionally at least 50,000 blood cells, optionally at least 100,000 blood cells, or optionally at least 150,000 white blood cells.

Clause 21. The system of clause 1, wherein the at least 10 morphology parameters per cell comprises at least 16 morphology parameters per cell and optionally at least about 20 morphology parameters per cell, at least 50 morphology parameters per cell, or at least 100 morphology parameters per cell.

Clause 22. The system of clause 1, wherein the at least 10 morphology parameters comprise 10 or more of a red blood cell ("RBC") parameter, a white blood cell ("WBC") parameter, a WBC subclass parameter, a WBC cytoplasm segmentation parameter, a WBC cytoplasm contour parameter, a WBC cytoplasm texture parameter, a WBC nucleus segmentation parameter, a WBC nucleus contour parameter, a WBC nucleus texture parameter, a WBC nucleus parameter, a WBC nucleoli parameter, a RBC subclass parameter, a RBC external contour parameter, a RBC internal white pallor parameter, a RBC internal contour parameter, a RBC cell shape parameter, a platelet parameter, a platelet contour parameter, a platelet granulation parameter, a platelet texture parameter, a non-hematological cell parameter, a circulating tumor cell (CTC) parameter, a circulating lymphoma parameter, a circulating plasma cell parameter, a cell inclusion parameter, an Auer rod parameter, a Dohle bodies parameter, a parasite parameter, a lymphocyte cytoplasm blue shift parameter, a lymphocyte cytoplasm granule parameter, a neutrophil nucleus blob parameter, a monocyte cytoplasm vacuole parameter, an eosinophil cytoplasmic granulation parameter, a basophil cytoplasm granulation parameter, a smudge cell area parameter, a white blood cell nucleus opacity parameter, an RBC paleness parameter, a cell area parameter, a cell contour length parameter, a white blood cell nucleus contour length parameter, a red blood cell redness parameter, a platelet granulation parameter, an inclusion parameter for an inclusion detected within the cell, a megakaryocyte cellular area to cytoplasm area parameter, a plasma cell area to Golgi area parameter, a low density neutrophil (LDN) parameter, a high density neutrophil (HDN) parameter, a hemoglobin per RBC parameter, a volume per cell parameter, a dry mass per cell parameter, or a cell surface area estimation parameter.

Clause 23. The system of clause 22, wherein the at least 10 morphology parameters comprise 10 or more internal cellular structure parameters comprising one or more of a WBC cytoplasm segmentation parameter, a WBC cytoplasm contour parameter, a WBC cytoplasm texture parameter, a WBC nucleus segmentation parameter, a WBC nucleus contour parameter, a WBC nucleus texture parameter, a WBC nucleus parameter, a WBC nucleoli parameter, a RBC internal white pallor parameter, or a RBC internal contour parameter and optionally wherein the 10 or more internal cellular parameters correspond to inclusions of the at least 500 cells.

Clause 24. The system of clause 1, wherein the plurality of images is processed with one or more of a neural network or a machine learning classifier to generate the 10 or more morphology parameters and optionally wherein the neural network comprises a convolutional neural network.

Clause 25. The system of clause 1, wherein the plurality of images is processed while the sample is scanned with the scanning apparatus.

Clause 26. The system of clause 1, wherein the plurality of images is processed while a slide supporting the sample is loaded into the optical scanning apparatus to view the sample.

Clause 27. The system of clause 9, wherein the output rate corresponds to at least 2000 cells per second, optionally 5000 cells per second, or optionally at least 1000 cells per second.

Clause 28. The system of clause 9, wherein the processor is configured to adjust the scan rate in response to the output rate.

Clause 29. The system of clause 9, wherein the processor is configured to adjust the output rate in response to the scan rate.

Clause 30. The system of clause 9, further comprising a balancer to adjust the scan rate or the output rate to correspond to within about 50% of each other.

Clause 31. The system of clause 1, wherein a scanned area of the sample comprises at least 1.0 cm2, optionally at least 2 cm2, optionally at least 5 cm2, optionally at least 10 cm2, or optionally at least 15 cm2.

Clause 32. The system of clause 1, wherein a scanned area of the sample is within a range from about 1.0 cm2 to about 15 cm2.

Clause 33. The system of clause 1, wherein the effective numerical aperture comprises a value of at least 0.9 and optionally at least 1.0.

Clause 34. The system of clause 1, wherein the effective numerical aperture is within a range from about 0.9 to about 1.5.

Clause 35. The system of clause 1, wherein the optical scanning apparatus comprises one or more lenses with a numerical aperture for an image of the sample formed on a sensor array of the optical scanning apparatus and wherein the numerical aperture is less than the effective numerical aperture.

Clause 36. The system of clause 1, wherein the blood sample comprises one or more of a peripheral blood smear, a bone marrow aspirate smear, or a body fluid smear.

Clause 37. The system of clause 1, wherein the processor is configured to combine the least 10 morphology parameters to detect a rare white blood cell in a population of WBCs with a sensitivity of less than 1 cell per 100 cells, optionally 1 cell per 500 cells, optionally 1 cell per 1000 cells, optionally 1 cell per 10,000 cells, optionally 1 cell per 50,000 cells, or optionally 1 cell per 100,000 cells.

Clause 38. The system of clause 37, wherein the rare white blood cell comprises one or more of a plasma cell, a circulating lymphoma cell, a blast cell, an immature cell, a hairy cell a binucleated cell ("buttocks cell"), a Sezary cell, or a cup-like blast.

Clause 39. The system of clause 1, wherein the processor is configured to combine the at least 10 morphology parameters to detect a rare morphological event of a white blood cell ("WBC") in a population of WBCs with a sensitivity of less than 1 even per 100 cells, optionally 1 event per 500 cells, optionally 1 event per 1000 cells, optionally 1 event per 10,000 cells, optionally 1 event per 50,000 cells, or optionally 1 event per 100,000 cells.

Clause 40. The system of clause 39, wherein the rare morphological event comprises one or more of a rare cell, a rare inclusion in a cell, an inclusion in a rare cell, Auer rods, Dohle bodies, a parasite, a plasma cell, a circulating lymphoma cell, a blast cell, or an immature cell.

Clause 41. The system of clause 1, wherein the processor is configured to provide a decision support system for a user to view a graphical presentation of cell data.

Clause 42. The system of clause 41, wherein the decision support system is configured for the user to interact with the cell data and view images and classifications of the at least 500 cells and to override a classification of a cell by inputting a different classification of the cell.

Clause 43. The system of clause 41, wherein the processor is configured to display statistical data for the at least 500 cells, the statistical data comprising one or more of a comparison of detected cell data over an area of the blood sample with predefined baseline values, an analysis of a distribution of values of classes of cells, or an analysis of ratios of classes of cells.

Clause 44. The system of clause 41, wherein the processor is configured to display a scatter plot of cell types for the at least 500 cells.

Clause 45. The system of clause 44, wherein the at least 500 cells comprise at least 1000 cells.

Clause 46. The system of clause 44, wherein a first axis of the scatter plot corresponds to a first morphology parameter of the at least 10 morphology parameters and a second axis of the scatter plot corresponds to a second morphology parameter of the at least 10 morphology parameters.

Clause 47. The system of clause 46, wherein the processor is configured to receive an input from a user to select the first morphology parameter of the at least 10 morphology parameters and the second morphology parameter of the at least 10 morphology parameters and optionally wherein the processor is configured to allow the user to select from at least 20 morphology parameters to select the first morphology parameter and the second morphology parameter in order to define the first axis and the second axis of the scatter plot.

Clause 48. The system of clause 1, wherein the processor is configured to provide a report for the at least 500 cells, the report comprising one or more of a differential interactive graph configured to change in response to user input, a subcellular interactive graph comprising percentages and number of subcellular structures, or an annotated image showing annotations for each of the at least 500 cells at a plurality of locations corresponding to locations of the at least 500 cells from the image.

Clause 49. The system of clause 1, wherein the processor is configured with instructions to detect a minimum residual disease ("MRD") in response to the at least 10 morphology parameters, the at least 500 cells comprising at least 10,000 cells, and wherein the at least 500 cells comprises one or more of plasma cells or blasts and optionally wherein the one or more of plasma cells or blasts are shown with a marking on an image of an area of the blood sample or a scatter plot comprising cell data for the at least 10,000 cells.

Clause 50. The system of clause 1, wherein the processor is configured to determine a cytoplasm toxicity for at least 1000 neutrophils in response to an amount of granulation for each of the at least 1000 neutrophils and optionally wherein the cytoplasm toxicity comprises a granulation index.

Clause 51. The system of clause 1, wherein the processor is configured to detect Auer rods and nucleoli of the at least 500 cells and to present a report for each cell comprising Auer rods, the report comprising metrics of the Auer rods and an image of the cell comprising the Auer rods.

Clause 52. The system of clause 1, wherein the processor is configured to present one or more of a lymphocyte cytoplasm blue shift distribution for a plurality of lymphocytes, a lymphocyte cytoplasmic granules distribution for a plurality of lymphocytes, a neutrophils number of nucleus lobes distribution for a plurality of neutrophils, a monocytes cytoplasmic vacuoles distribution for a plurality of monocytes, an eosinophils cytoplasmic granulation distribution for a plurality of eosinophils, a basophils cytoplasmic granulation distribution for a plurality of basophils, a smudge cells area distribution for a plurality of smudge cells, a WBC nucleus opacity level distribution for a plurality of WBCs, a ratio of RBC white palar area to RBC area distribution for a plurality of RBCs, a RBC area distribution for a plurality of RBCs, a WBC area distribution for a plurality of RBCs, a Platelet area distribution for a plurality of platelets, a RBC contour length distribution for a plurality of RBCs, a WBC contour length distribution for a plurality of WBCs, a platelet contour length distribution for a plurality of WBCs, a WBC nucleus contour length distribution for a plurality of WBC nuclei, a RBC redness level distribution for a plurality of RBCs, a platelets granulation distribution for a plurality of platelets, a high sensitive cells inclusions, a ratio of inclusion area to total cellular area, a number of detected parasites, a parasite detected as an inclusion in a blood cell a megakaryocyte cell area to cytoplasm area ratio distribution for a plurality of megakaryocytes, or a plasma cells Golgi area to plasma cells area ratio distribution for a plurality of megakaryocytes.

Clause 53. The system of clause 1, wherein the processor is configured to receive an input corresponding to one or more of a confidence interval or a p-value for one or more of a cell type or a cell morphology and wherein the processor is configured to determine a number of cells to classify in response to the input and optionally wherein the number of cells comprises at least 50,000 cells and further optionally at least 100,000 cells.

Clause 54. The system of clause 1, wherein the sample comprises a blood smear and the scanning apparatus is configured to scan one or more of a body, a monolayer of cells or a feathered edge of the blood smear and optionally wherein the processor is configured to classify at least half of the at least 500 blood cells from the monolayer.

Clause 55. A method for imaging and analyzing a blood sample, the method comprising: scanning the sample with an optical scanning apparatus comprising an effective numerical aperture of at least 0.8, wherein the optical scanning apparatus produces a plurality of images of the sample, the plurality of images comprising at least 500 blood cells; analyzing, with a processor, the plurality of images to determine at least morphology parameters for each of the at least 500 blood cells; and outputting the at least 10 morphology parameters.

Clause 56. The method of clause 55, wherein the at least 500 blood cells comprise at least 500 white blood cells and the at least 10 morphology parameters is determined for each of the at least 500 white blood cells.

Clause 57. The method of clause 56, wherein the processor outputs the at least morphology parameters for each of the at least 500 white blood cells.

Clause 58. The method of clause 56, wherein the sample comprises at least 1000 white blood cells and optionally at least 1500 WBCs, optionally at least 2000 WBCs, optionally at least 5000 WBCs, or optionally at least 10,000 WBCs.

Clause 59. The method of clause 55, wherein the sample comprises at least red blood cells, optionally at least 100,000 RBCs, or optionally at least 150,000 RBCs.

Clause 60. The method of clause 55, wherein the optical scanning apparatus and the processor process a plurality of samples at a rate of at least 15 samples per hour, optionally at least 20 samples per hour, optionally at least 25 samples per hour at least 30 samples per hour, optionally at least 35 samples per hour, or optionally at least 40 samples per hour.

Clause 61. The method of clause 55, wherein the at least 10 morphology parameters comprise at least 12 morphology parameters, optionally at least 15 morphology parameters, optionally at least 20 morphology parameters, optionally at least morphology parameters, or optionally at least 30 morphology parameters.

Clause 62. The method of clause 55, wherein the optical scanning apparatus and the processor scan an area of the sample at a scan rate and generate image data corresponding to at least 1000 cells per second.

Clause 63. The method of clause 62, wherein the processor outputs the at least morphology parameters per cell at an output rate corresponding to the at least 1000 cells per second.

Clause 64. The method of clause 55, further presenting cell data on a display.

Clause 65. The method of clause 55, wherein the at least 10 morphology parameters comprise one or more of cell type, a cell inclusion, a cell subpopulation, a distribution of cellular parameters across a population of cells, or a distribution of cells across a sub-population.

Clause 66. The method of clause 55, further comprising a display configured to present morphological parameters of a cell and an image of a cell simultaneously on a display for a user to verify a type of the cell.

Clause 67. The method of clause 55, wherein an area of the blood sample is scanned at a scan rate to generate image data while the at least 10 morphology parameters are generated at an output rate.

Clause 68. The method of clause 67, wherein the area comprises a plurality of areas, and wherein the plurality of areas is scanned at the scan rate to generate the image data from the plurality of areas and the output is generated at the output rate while the plurality of areas is scanned.

Clause 69. The method of clause 67, wherein the optical scanning apparatus scans the area and generates a first plurality of images with a first spatial resolution and wherein the processor processes the first plurality of images to generate a second plurality of images with a second spatial resolution greater than the first spatial resolution and wherein the processor processes the second plurality of images to generate the at least 10 morphology parameters per cell.

Clause 70. The method of clause 67, wherein the scan rate and the output rate to correspond to within about 50% of each other and optionally to within about 25% of each other.

Clause 71. The method of clause 67, wherein the area comprises at least 0.4 cm2 and an optical resolution of an image of the area is within a range from about 200 nm to about 500 nm and optionally within a range from about 200 nm to about 400 nm.

Clause 72. The method of clause 71, wherein a pixel resolution of the image of the area is within a range from about 100 nm to about 250 nm and optionally within a range from about 100 nm to about 200 nm.

Clause 73. The method of clause 72, wherein the scan rate is within a range from 0.3 mm2 per second to 10 mm2 per second, optionally from 0.3 mm2 per second to 4 mm2 per second, or optionally from 1 mm2 per second to 10 mm2 per second.

Clause 74. The method of clause 55, wherein the at least 500 blood cells comprise at least 1000 blood cells, optionally at least blood 2000 cells, optionally at least blood 5000 cells, optionally at least blood 10,000 cells, optionally at least 20,000 blood cells, optionally at least 50,000 blood cells, optionally at least 100,000 blood cells, or optionally at least 150,000 white blood cells.

Clause 75. The method of clause 55, wherein the at least 10 morphology parameters per cell comprises at least 16 morphology parameters per cell and optionally at least about 20 morphology parameters per cell, at least 50 morphology parameters per cell, or at least 100 morphology parameters per cell.

Clause 76. The method of clause 55, wherein the at least 10 morphology parameters comprise 10 or more of a red blood cell ("RBC") parameter, a white blood cell ("WBC") parameter, a WBC subclass parameter, a WBC cytoplasm segmentation parameter, a WBC cytoplasm contour parameter, a WBC cytoplasm texture parameter, a WBC nucleus segmentation parameter, a WBC nucleus contour parameter, a WBC nucleus texture parameter, a WBC nucleus parameter, a WBC nucleoli parameter, a RBC subclass parameter, a RBC external contour parameter, a RBC internal white pallor parameter, a RBC internal contour parameter, a RBC cell shape parameter, a platelet parameter, a platelet contour parameter, a platelet granulation parameter, a platelet texture parameter, a non-hematological cell parameter, a circulating tumor cell (CTC) parameter, a circulating lymphoma parameter, a circulating plasma cell parameter, a cell inclusion parameter, an Auer rod parameter, a Dohle bodies parameter, a parasite parameter, a lymphocyte cytoplasm blue shift parameter, a lymphocyte cytoplasm granule parameter, a neutrophil nucleus blob parameter, a monocyte cytoplasm vacuole parameter, an eosinophil cytoplasmic granulation parameter, a basophil cytoplasm granulation parameter, a smudge cell area parameter, a white blood cell nucleus opacity parameter, an RBC paleness parameter, a cell area parameter, a cell contour length parameter, a white blood cell nucleus contour length parameter, a red blood cell redness parameter, a platelet granulation parameter, an inclusion parameter for an inclusion detected within the cell, a megakaryocyte cellular area to cytoplasm area parameter, a plasma cell area to Golgi area parameter, a low density neutrophil (LDN) parameter, a high density neutrophil (HDN) parameter, a hemoglobin per RBC parameter, a volume per cell parameter, a dry mass per cell parameter, or a cell surface area estimation parameter.

Clause 77. The method of clause 76, wherein the at least 10 morphology parameters comprise 10 or more internal cellular structure parameters comprising one or more of a WBC cytoplasm segmentation parameter, a WBC cytoplasm contour parameter, a WBC cytoplasm texture parameter, a WBC nucleus segmentation parameter, a WBC nucleus contour parameter, a WBC nucleus texture parameter, a WBC nucleus parameter, a WBC nucleoli parameter, a RBC internal white pallor parameter, or a RBC internal contour parameter and optionally wherein the 10 or more internal cellular parameters correspond to inclusions of the at least 500 cells.

Clause 78. The method of clause 55, wherein the processor processes the plurality of images with one or more of a neural network or a machine learning classifier to generate the 10 or more morphology parameters and optionally wherein the neural network comprises a convolutional neural network.

Clause 79. The method of clause 55, wherein the plurality of images is processed while the sample is scanned with the scanning apparatus.

Clause 80. The method of clause 55, wherein the plurality of images is processed while a slide supporting the sample is loaded into the optical scanning apparatus to view the sample.

Clause 81. The method of clause 63, wherein the output rate corresponds to at least 2000 cells per second, optionally 5000 cells per second, or optionally at least 1000 cells per second.

Clause 82. The method of clause 63, wherein the processor adjusts the scan rate in response to the output rate.

Clause 83. The method of clause 63, wherein the processor adjusts the output rate in response to the scan rate.

Clause 84. The method of clause 63, wherein a balancer adjusts the scan rate or the output rate to correspond to within about 50% of each other.

Clause 85. The method of clause 55, wherein a scanned area of the sample comprises at least 1.0 cm2, optionally at least 2 cm2, optionally at least 5 cm2, optionally at least 10 cm2, or optionally at least 15 cm2.

Clause 86. The method of clause 55, wherein a scanned area of the sample is within a range from about 1.0 cm2 to about 15 cm2.

Clause 87. The method of clause 55, wherein the effective numerical aperture comprises a value of at least 0.9 and optionally at least 1.0.

Clause 88. The method of clause 55, wherein the effective numerical aperture is within a range from about 0.9 to about 1.5.

Clause 89. The method of clause 55, wherein the optical scanning apparatus comprises one or more lenses with a numerical aperture for an image of the sample formed on a sensor array of the optical scanning apparatus and wherein the numerical aperture is less than the effective numerical aperture.

Clause 90. The method of clause 55, wherein the blood sample comprises one or more of a peripheral blood smear, a bone marrow aspirate smear, or a body fluid smear.

Clause 91. The method of clause 55, wherein the processor combines the least morphology parameters to detect a rare white blood cell in a population of WBCs with a sensitivity of less than 1 cell per 100 cells, optionally 1 cell per 500 cells, optionally 1 cell per 1000 cells, optionally 1 cell per 10,000 cells, optionally 1 cell per 50,000 cells, or optionally 1 cell per 100,000 cells.

Clause 92. The method of clause 91, wherein the rare white blood cell comprises one or more of a plasma cell, a circulating lymphoma cell, a blast cell, an immature cell, a hairy cell a binucleated cell ("buttocks cell"), a Sezary cell, or a cup-like blast.

Clause 93. The method of clause 55, wherein the processor combines the at least 10 morphology parameters to detect a rare morphological event of a white blood cell ("WBC") in a population of WBCs with a sensitivity of less than 1 even per 100 cells and optionally 1 event per 500 cells, optionally 1 event per 1000 cells, optionally 1 event per cells, optionally 1 event per 50,000 cells, or optionally 1 event per 100,000 cells.

Clause 94. The method of clause 93, wherein the rare morphological event comprises one or more of a rare cell, a rare inclusion in a cell, an inclusion in a rare cell, Auer rods, Dohle bodies, a parasite, a plasma cell, a circulating lymphoma cell, a blast cell, or an immature cell.

Clause 95. The method of clause 55, wherein the processor provides a decision support system for a user to view a graphical presentation of cell data.

Clause 96. The method of clause 95, wherein the decision support system allows the user to interact with the cell data and view images and classifications of the at least 500 cells and to override a classification of a cell by inputting a different classification of the cell.

Clause 97. The method of clause 95, wherein the processor displays statistical data for the at least 500 cells, the statistical data comprising one or more of a comparison of detected cell data over an area of the blood sample with predefined baseline values, an analysis of a distribution of values of classes of cells, or an analysis of ratios of classes of cells.

Clause 98. The method of clause 95, wherein the processor displays a scatter plot of cell types for the at least 500 cells.

Clause 99. The method of clause 98, wherein the at least 500 cells comprise at least 1000 cells.

Clause 100. The method of clause 98, wherein a horizontal axis of the scatter plot corresponds to a first morphology parameter of the at least 10 morphology parameters and a vertical axis of the scatter plot corresponds to a second morphology parameter of the at least 10 morphology parameters.

Clause 101. The method of clause 100, wherein the processor is configured to receive an input from a user to selecting the first morphology parameter of the at least 10 morphology parameters and the second morphology parameter of the at least 10 morphology parameters and optionally wherein the processor is configured to allow the user to select from at least 20 morphology parameters to select the first morphology parameter and the second morphology parameter in order to define a first axis and a second axis of the scatter plot.

Clause 102. The method of clause 55, wherein the processor provides a report for the at least 500 cells, the report comprising one or more of a differential interactive graph configured to change in response to user input, a subcellular interactive graph comprising percentages and number of subcellular structures, or an annotated image showing annotations for each of the at least 500 cells at a plurality of locations corresponding to locations of the at least 500 cells from the image.

Clause 103. The method of clause 55, wherein the processor detects a minimum residual disease ("MRD") in response to the at least 10 morphology parameters, the at least 500 cells comprising at least 10,000 cells, and wherein the at least 500 cells comprises one or more of plasma cells or blasts and optionally wherein the one or more of plasma cells or blasts are shown with a marking on an image of an area of the blood sample or a scatter plot comprising cell data for the at least 10,000 cells.

Clause 104. The method of clause 55, wherein the processor determines a cytoplasm toxicity for at least 1000 neutrophils in response to an amount of granulation for each of the at least 1000 neutrophils and optionally wherein the cytoplasm toxicity comprises a granulation index.

Clause 105. The method of clause 55, wherein the processor detects Auer rods and nucleoli of the at least 500 cells and to present a report for each cell comprising Auer rods, the report comprising metrics of the Auer rods and an image of the cell comprising the Auer rods.

Clause 106. The method of clause 55, wherein the processor presents one or more of a lymphocyte cytoplasm blue shift distribution for a plurality of lymphocytes, a lymphocyte cytoplasmic granules distribution for a plurality of lymphocytes, a neutrophils number of nucleus lobes distribution for a plurality of neutrophils, a monocytes cytoplasmic vacuoles distribution for a plurality of monocytes, an eosinophils cytoplasmic granulation distribution for a plurality of eosinophils, a basophils cytoplasmic granulation distribution for a plurality of basophils, a smudge cells area distribution for a plurality of smudge cells, a WBC nucleus opacity level distribution for a plurality of WBCs, a ratio of RBC white palar area to RBC area distribution for a plurality of RBCs, a RBC area distribution for a plurality of RBCs, a WBC area distribution for a plurality of RBCs, a Platelet area distribution for a plurality of platelets, a RBC contour length distribution for a plurality of RBCs, a WBC contour length distribution for a plurality of WBCs, a platelet contour length distribution for a plurality of WBCs, a WBC nucleus contour length distribution for a plurality of WBC nuclei, a RBC redness level distribution for a plurality of RBCs, a platelets granulation distribution for a plurality of platelets, a high sensitive cells inclusions, a ratio of inclusion area to total cellular area, a number of detected parasites, a parasite detected as an inclusion in a blood cell a megakaryocyte cell area to cytoplasm area ratio distribution for a plurality of megakaryocytes, or a plasma cells Golgi area to plasma cells area ratio distribution for a plurality of megakaryocytes.

Clause 107. The method of clause 55, wherein the processor receives an input corresponding to one or more of a confidence interval or a p-value for one or more of a cell type or a cell morphology and wherein the processor determines a number of cells to classify in response to the input and optionally wherein the number of cells comprises at least 50,000 cells and further optionally at least 100,000 cells.

Clause 108. The method of clause 55, wherein the sample comprises a blood smear and the scanning apparatus is configured to scan one or more of a body, a monolayer of cells or a feathered edge of the blood smear and optionally wherein the processor is configured to classify at least half of the at least 500 blood cells from the monolayer.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A system for imaging and analyzing a blood sample, the system comprising an optical scanning apparatus to scan the sample with an effective numerical aperture of at least 0.8;

a processor coupled to the scanning apparatus and configured to:

scan the sample with the optical scanning apparatus to produce a plurality of images of the sample, the plurality of images comprising at least 500 blood cells;

analyze the plurality of images to determine at least 10 morphology cellular parameters for each of a plurality of at least 500 blood cells; and output the at least 10 morphology cellular parameters for each of the plurality of at least 500 blood cells to be analyzed further.

2. The system of claim 1, wherein the at least 500 blood cells comprise at least 500 white blood cells and the processor is configured to determine the at least 10 morphology cellular parameters for each of the at least 500 white blood cells.

3. The system of claim 2, wherein the processor is configured to output the at least 10 morphology cellular parameters for each of the at least 500 white blood cells.

4. The system of claim 2, wherein the sample comprises at least 1000 white blood cells ("WBCs").

5. The system of claim 1, wherein the sample comprises at least 2,000 red blood cells ("RBCs").

6. The system of claim 1, wherein the optical scanning apparatus and the processor are configured to process a plurality of samples at a rate of at least 15 samples per hour.

7. The system of claim 1, wherein the at least 10 morphology cellular parameters comprise at least 12 morphology cellular parameters.

8. The system of claim 1, wherein the processor and the optical scanning apparatus are configured to scan an area of the sample at a scan rate to generate image data corresponding to at least 1000 cells per second.

9. The system of claim 8, wherein the processor is configured to output the at least 10 morphology cellular parameters per cell at an output rate corresponding to the at least 1000 cells per second.

10. The system of claim 1, further comprising a display configured to present cell data.

11. The system of claim 1, wherein the at least 10 morphology cellular parameters comprise one or more of cell type, a cell inclusion, a cell subpopulation, a distribution of cellular parameters across a population of cells, or a distribution of cells across a sub-population.

12. The system of claim 1, further comprising a display configured to present morphological parameters of a cell and an image of a cell simultaneously on a display for a user to verify a type of the cell.

13. The system of claim 1, wherein an area of the blood sample is scanned at a scan rate to generate image data while the at least 10 morphology parameters are generated at an output rate.

14. The system of claim 13, wherein the area comprises a plurality of areas, and wherein the plurality of areas is scanned at the scan rate to generate the image data from the plurality of areas and the output is generated at the output rate while the plurality of areas is scanned.

15. The system of claim 13, wherein the area is scanned with the optical scanning apparatus to generate a first plurality of images with a first spatial resolution and wherein the first plurality of images is processed to generate a second plurality of images with a second spatial resolution greater than the first spatial resolution and wherein the second plurality of images is processed to generate the at least 10 morphology cellular parameters per cell.

16. The system of claim 13, wherein the scan rate and the output rate to correspond to within about 50% of each other.

17. The system of claim 13, wherein the area comprises at least 0.4 $cm^2$ and an optical resolution of an image of the area is within a range from about 200 nm to about 500 nm.

18. The system of claim 17, wherein a pixel resolution of the image of the area is within a range from about 100 nm to about 250 nm.

19. The system of claim 18, wherein the scan rate is within a range from 0.3 $mm^2$ per second to 10 $mm^2$ per second.

20. The system of claim 1, wherein the at least 500 blood cells comprise at least 1000 blood cells.

21. The system of claim 1, wherein the sample comprises a monolayer of cells on a support.

22. The system of claim 1, wherein the at least 10 morphology cellular parameters comprise 10 or more of a red blood cell ("RBC") parameter, a white blood cell ("WBC") parameter, a WBC subclass parameter, a WBC cytoplasm segmentation parameter, a WBC cytoplasm contour parameter, a WBC cytoplasm texture parameter, a WBC nucleus segmentation parameter, a WBC nucleus contour parameter, a WBC nucleus texture parameter, a WBC nucleus parameter, a WBC nucleoli parameter, a RBC subclass parameter, a RBC external contour parameter, a RBC internal white pallor parameter, a RBC internal contour parameter, a RBC cell shape parameter, a platelet parameter, a platelet contour parameter, a platelet granulation parameter, a platelet texture parameter, a non-hematological cell parameter, a circulating tumor cell (CTC) parameter, a circulating lymphoma parameter, a circulating plasma cell parameter, a cell inclusion parameter, an Auer rod parameter, a Dohle bodies parameter, a parasite parameter, a lymphocyte cytoplasm blue shift parameter, a lymphocyte cytoplasm granule parameter, a neutrophil nucleus blob parameter, a monocyte cytoplasm vacuole parameter, an eosinophil cytoplasmic granulation parameter, a basophil cytoplasm granulation parameter, a smudge cell area parameter, a white blood cell nucleus opacity parameter, an RBC paleness parameter, a cell area parameter, a cell contour length parameter, a white blood cell nucleus contour length parameter, a red blood cell redness parameter, a platelet granulation parameter, an inclusion parameter for an inclusion detected within the cell, a megakaryocyte cellular area to cytoplasm area parameter, a plasma cell area to Golgi area parameter, a low density neutrophil (LDN) parameter, a high density neutrophil (HDN) parameter, a hemoglobin per RBC parameter, a volume per cell parameter, a dry mass per cell parameter, or a cell surface area estimation parameter.

* * * * *